(12) United States Patent
Tamir et al.

(10) Patent No.: US 11,275,709 B2
(45) Date of Patent: *Mar. 15, 2022

(54) SYSTEMS AND METHODS FOR MULTI-ARCHITECTURE COMPUTING

(71) Applicant: Intel Corporation, Santa Clara, CA (US)

(72) Inventors: Eliezer Tamir, Bait Shemesh (IL); Ben-Zion Friedman, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 1168 days.

This patent is subject to a terminal disclaimer.

(21) Appl. No.: 15/584,343

(22) Filed: May 2, 2017

(65) Prior Publication Data

US 2018/0322090 A1    Nov. 8, 2018

(51) Int. Cl.
*G06F 15/173*   (2006.01)
*G06F 11/14*    (2006.01)
*G06F 9/48*     (2006.01)
*G06F 15/76*    (2006.01)
*G06F 11/30*    (2006.01)
*H04L 29/08*    (2006.01)
(Continued)

(52) U.S. Cl.
CPC ...... *G06F 15/17325* (2013.01); *G06F 9/4856* (2013.01); *G06F 11/14* (2013.01); *G06F 11/3006* (2013.01); *G06F 11/3041* (2013.01); *G06F 11/3055* (2013.01); *G06F 11/3058* (2013.01); *G06F 11/3062* (2013.01); *G06F 15/76* (2013.01); *G06F 9/4552* (2013.01); *G06F 2201/815* (2013.01); *G06F 2201/84* (2013.01); *H04L 67/1002* (2013.01)

(58) Field of Classification Search
CPC ...................................................... G06T 1/60
See application file for complete search history.

(56) References Cited

U.S. PATENT DOCUMENTS 5,598,546 A * 1/1997 Blomgren ........... G06F 9/30174
712/209
5,933,642 A    8/1999 Greenbaum et al.
(Continued)

OTHER PUBLICATIONS

Notice of Allowance in U.S. Appl. No. 15/386,990 dated May 15, 2019, 6 pages.
(Continued)

*Primary Examiner* — Henry Tsai
*Assistant Examiner* — Juanito Borromeo
(74) *Attorney, Agent, or Firm* — Patent Capital Group

(57) ABSTRACT

Disclosed herein are systems and methods for multi-architecture computing. For example, in some embodiments, a computing system may include: a processor system including at least one first processor core having a first instruction set architecture (ISA); a memory device coupled to the processor system, wherein the memory device has stored thereon a first binary representation of a program for the first ISA; and control logic to suspend execution of the program by the at least one first processor core and cause at least one second processor core to resume execution of the program, wherein the at least one second processor core has a second ISA different from the first ISA; wherein the program is to generate data having an in-memory representation compatible with both the first ISA and the second ISA.

25 Claims, 15 Drawing Sheets

(51) Int. Cl.
*G06F 9/455* (2018.01)
*H04L 67/1001* (2022.01)

(56) References Cited

U.S. PATENT DOCUMENTS

| | | | |
|---|---|---|---|
| 6,496,922 | B1 | 12/2002 | Borrill |
| 7,047,394 | B1 | 5/2006 | Dyke et al. |
| 7,480,901 | B2 | 1/2009 | Arenburg et al. |
| 7,634,768 | B2 | 12/2009 | Chen et al. |
| 7,647,474 | B2* | 1/2010 | Bulusu .................. G06F 1/305 712/228 |
| 7,707,389 | B2 | 4/2010 | Banerjee et al. |
| 8,806,182 | B2* | 8/2014 | Rymarczyk ......... G06F 9/30181 712/229 |
| 9,513,977 | B2 | 12/2016 | Li et al. |
| 2003/0123587 | A1 | 7/2003 | Blaum et al. |
| 2003/0182655 | A1 | 9/2003 | Hundt et al. |
| 2004/0268107 | A1 | 12/2004 | Zimmer et al. |
| 2005/0172105 | A1 | 8/2005 | Doering et al. |
| 2005/0216627 | A1 | 9/2005 | Goud et al. |
| 2006/0080682 | A1 | 4/2006 | Anwar et al. |
| 2008/0022278 | A1 | 1/2008 | Gschwind et al. |
| 2008/0059769 | A1 | 3/2008 | Rymarczyk et al. |
| 2008/0162873 | A1 | 7/2008 | Zimmer et al. |
| 2008/0172657 | A1 | 7/2008 | Bensal et al. |
| 2008/0256330 | A1 | 10/2008 | Wang et al. |
| 2009/0037911 | A1 | 2/2009 | Ahuja et al. |
| 2009/0144528 | A1 | 6/2009 | Asai et al. |
| 2010/0042979 | A1 | 2/2010 | Nanja et al. |
| 2010/0083223 | A1 | 4/2010 | Chouinard et al. |
| 2010/0125837 | A1 | 5/2010 | Lobo et al. |
| 2010/0153921 | A1 | 6/2010 | Klein |
| 2012/0324465 | A1 | 12/2012 | Miskelly |
| 2013/0290645 | A1 | 10/2013 | Ven |
| 2013/0338993 | A1 | 12/2013 | Zhong et al. |
| 2014/0068289 | A1 | 3/2014 | Beck |
| 2014/0082630 | A1 | 3/2014 | Ginzburg et al. |
| 2014/0189679 | A1 | 7/2014 | Adams et al. |
| 2014/0196019 | A1 | 7/2014 | Chen |
| 2014/0208043 | A1 | 7/2014 | Goddard |
| 2014/0244983 | A1 | 8/2014 | McDonald et al. |
| 2015/0026432 | A1 | 1/2015 | Borkenhagen et al. |
| 2015/0121041 | A1 | 4/2015 | Venkatachar et al. |
| 2015/0269004 | A1 | 9/2015 | Gainey et al. |
| 2015/0347107 | A1 | 12/2015 | Munshi et al. |
| 2016/0062874 | A1 | 3/2016 | Brites et al. |
| 2016/0162293 | A1* | 6/2016 | Hooker ................ G06F 9/3009 712/216 |
| 2016/0202980 | A1 | 7/2016 | Henry et al. |
| 2016/0216951 | A1 | 7/2016 | Kruglick et al. |
| 2016/0283211 | A1 | 9/2016 | Bertolli et al. |
| 2016/0283438 | A1 | 9/2016 | Chen et al. |
| 2016/0321089 | A1 | 11/2016 | Sandlin et al. |
| 2016/0364276 | A1 | 12/2016 | Wu et al. |
| 2017/0116029 | A1 | 4/2017 | Azam et al. |
| 2017/0161039 | A1 | 6/2017 | Banerjee et al. |
| 2018/0101370 | A1 | 4/2018 | Huang et al. |
| 2018/0173529 | A1 | 6/2018 | Tamir et al. |
| 2018/0173530 | A1 | 6/2018 | Tamir et al. |
| 2018/0173674 | A1 | 6/2018 | Tamir et al. |
| 2018/0173675 | A1 | 6/2018 | Tamir et al. |

OTHER PUBLICATIONS

Non Final Office Action in U.S. Appl. No. 15/386,833 dated Aug. 15, 2019, 10 pages.
Final Office Action in U.S. Appl. No. 15/386,833 dated Dec. 20, 2018, 11 pages.
Final Office Action in U.S. Appl. No. 15/386,990 dated Dec. 20, 2018, 12 pages.
Final Office Action in U.S. Appl. No. 15/387,106 dated Jun. 4, 2019, 14 pages.
Final Office Action in U.S. Appl. No. 15/386,919 dated Sep. 11, 2019, 38 pages.
Notice of Allowance in U.S. Appl. No. 15/386,990 dated Sep. 24, 2019, 6 pages.
Yiqing, Song et al, "The implementation of Dynamic Linking in Dynamic Binary Translation Systems", 2009 First International Workshop on Education Technology and Computer Science, pp. 643-646, https://ieeexplore.ieee.org/samp/stamp.jsp?tp=arnumber=4959119 (Year 2009).
Cunningham, "'Samsung Dex' is a $150 Galaxy S8 dock that makes your phone into a desktop", Gear* Gadgets, Mar. 30, 2017, 3 pages.
Gite, "Linux Hotplug a CPU and Disable CPU Cores at Run Time", nixCraft, Apr. 2, 2009, 10 pages.
Tamir et al., "Systems and Methods for Multi-Architecture Computing", U.S. Appl. No. 15/386,833, filed Dec. 21, 2016.
Tamir et al., "Systems and Methods for Multi-Architecture Computing", U.S. Appl. No. 15/386,919, filed Dec. 21, 2016.
Tamir et al., "Systems and Methods for Multi-Architecture Computing", U.S. Appl. No. 15/386,990, filed Dec. 21, 2016.
Tamir et al., "Systems and Methods for Multi-Architecture Computing", U.S. Appl. No. 15/387,106, filed Dec. 21, 2016.
VMware, "Citrix to have a crack at desktops on docked smartphones", Mar. 29, 2017; 2 pages.
Cross-Architecture Binary Semantics Understanding via Similar Code Comparison, Mar. 10, 2016, pp. 57-66. https://ieeexplore.ieee.org/stamp/stamp.jsp?tp=&arnumber=7476630 (Year: 2016).
Non-Final Office Action issued in U.S. Appl. No. 15/386,919, dated Apr. 20, 2018, 40 pages.
Ubiquitous Computing Platform via Hardware Assisted ISA Virtualization, 2013, pp. 1-6. https://ieeexplore.ieee.org/stamp/stamp.jsp?tp=&arnumber=6544401 (Year: 2013).
United States Patent Application for U.S. Appl. No. 15/386,833, filed Dec. 21, 2016, 58 pages.
United States Patent Application for U.S. Appl. No. 15/386,919, filed Dec. 21, 2016, 59 pages.
United States Patent Application for U.S. Appl. No. 15/386,990, filed Dec. 21, 2016, 58 pages.
United States Patent Application for U.S. Appl. No. 15/387,106, filed Dec. 21, 2016, 58 pages.
DiFederico et al., "A jump-target identification methods for multi-architecture static binary translation", 2016, pp. 1-10, retrieved by USPTO in Non Final Office Action U.S. Appl. No. 15/386,919 dated Mar. 5, 2019, https://ieeexplore.ieee.org/stamp/stamp.jsp?tp=$arnumber=7745280 (Year: 2016).
Karaki et al, "Multiple Instruction Sets Architecture (MISA)", pp. 1-6, retrieved by USPTO in Non Final Office Action U.S. Appl. No. 15/386,919 dated Mar. 5, 2019, https://ieeexplore.ieee.org/stamp/stamp.jsp?tp=$arnumber=6136696 (Year: 2011).
Non Final Office Action in U.S. Appl. No. 15/386,833 dated Mar. 21, 2019, 11 pages.
Non Final Office Action in U.S. Appl. No. 15/386,919 dated Mar. 5, 2019, 11 pages.
Non Final Office Action in U.S. Appl. No. 15/387,106 dated Dec. 19, 2018, 13 pages.
Notice of Allowance in U.S. Appl. No. 15/386,990 dated Feb. 21, 2019, 10 pages.
Venkat et al., "Harnessing ISA Diversity: Design of a Heterogeneous-IDA Chip Multiprocessor", pp. 1-12, retrieved by USPTO in Non Final Office Action in U.S. Appl. No. 15/386,919 dated Mar. 5, 2019, http://www.cs.virginia.edu/-av6ds/papers/isca2014.pdf (Year: 2014).
Boran, Nimal Kumar, Performance Modeling of Heterogeneous ISA Multicore Architectures, 2016.
Liu, Hongwei, "A HW/SW Co-design of Execution Migration for Shared-ISA Heterogeneous Chip Multiprocessors," 2013, pp. 23-30.
USPTO Nov. 16, 2018 Final Office Action from U.S. Appl. No. 15/386,919.
USPTO Feb. 14, 2020—Notice of Allowance from U.S. Appl. No. 15/386,833.
USPTO Mar. 17, 2020 Notice of Allowance from U.S. Appl. No. 15/386,919.
Non Final Office Action in U.S. Appl. No. 15/386,833 dated Jul. 25, 2018, 13 pages.
Non Final Office Action in U.S. Appl. No. 15/386,990 dated Jul. 25, 2018, 13 pages.

(56) References Cited

OTHER PUBLICATIONS

Non Final Office Action in U.S. Appl. No. 15/387,106 dated Jul. 25, 2018, 13 pages.

* cited by examiner

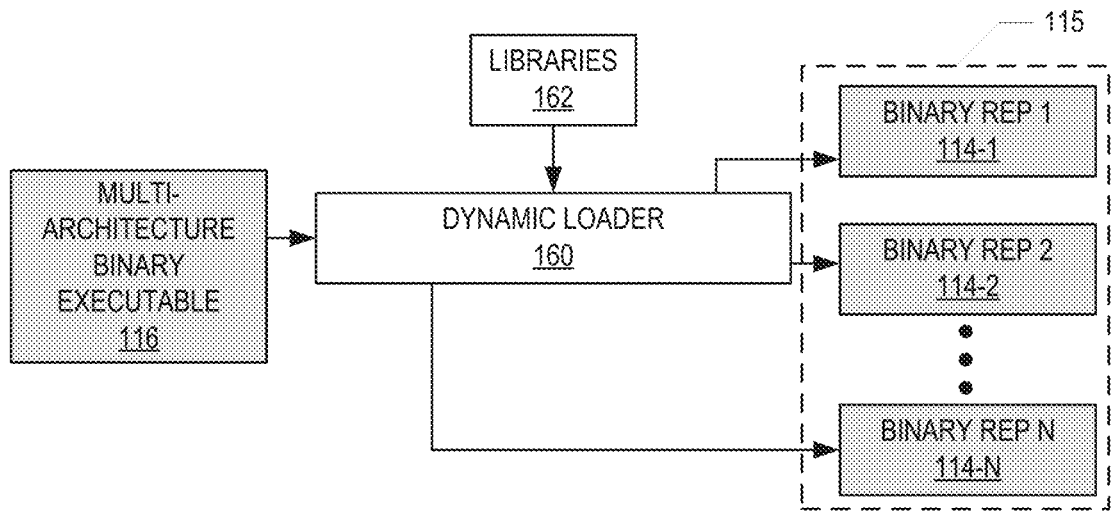
FIG. 5
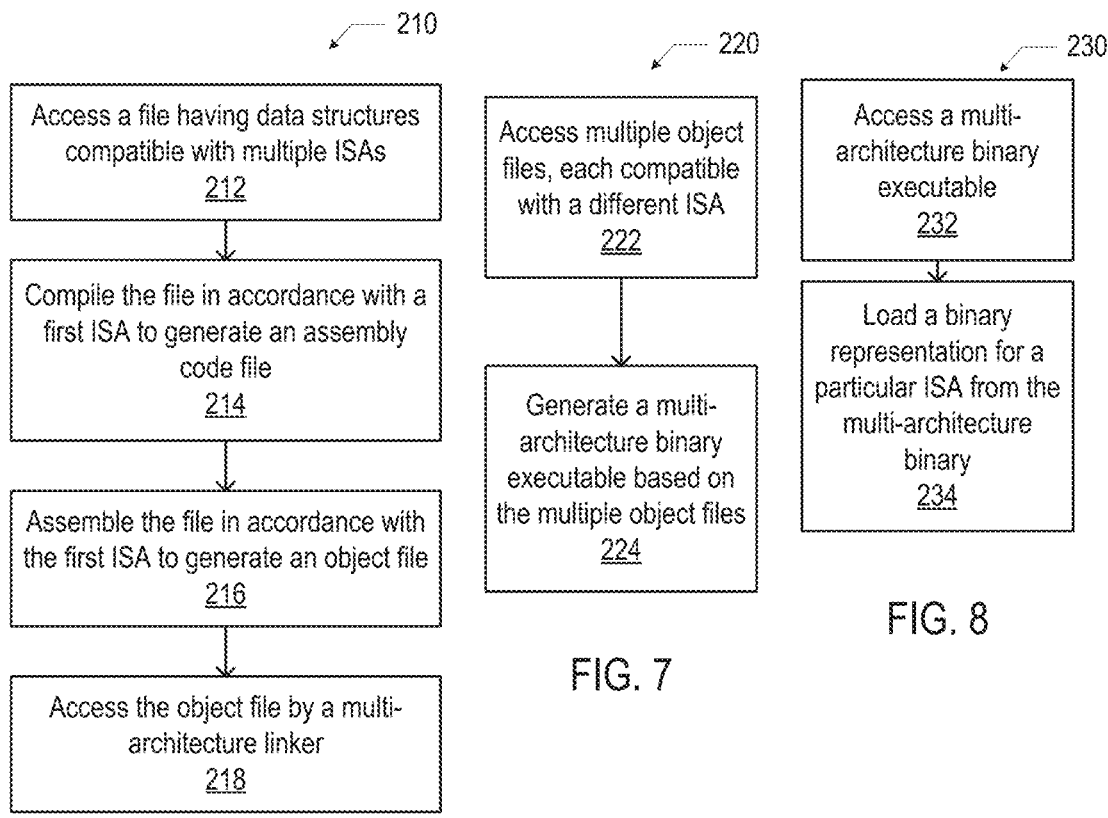
FIG. 6
FIG. 7
FIG. 8

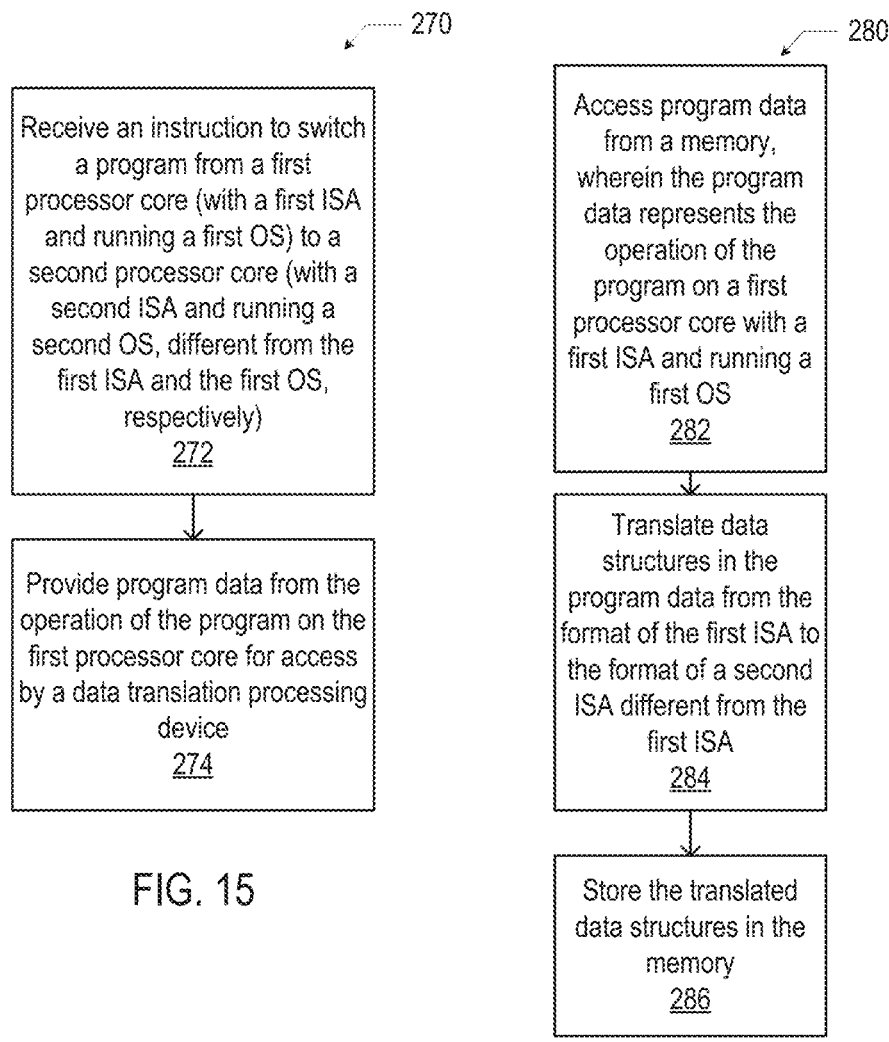
FIG. 15
FIG. 16
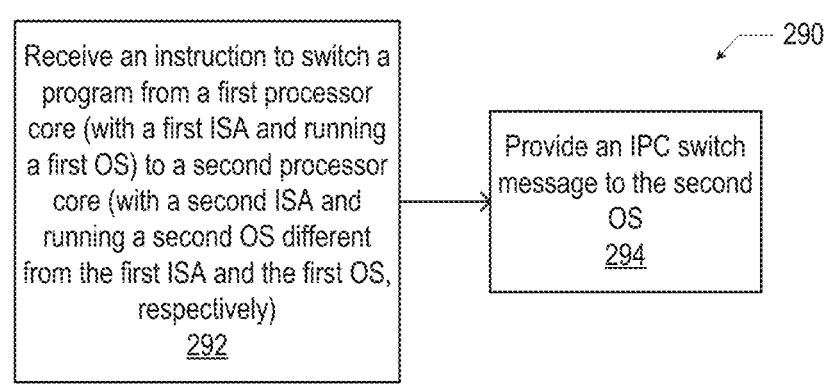
FIG. 17

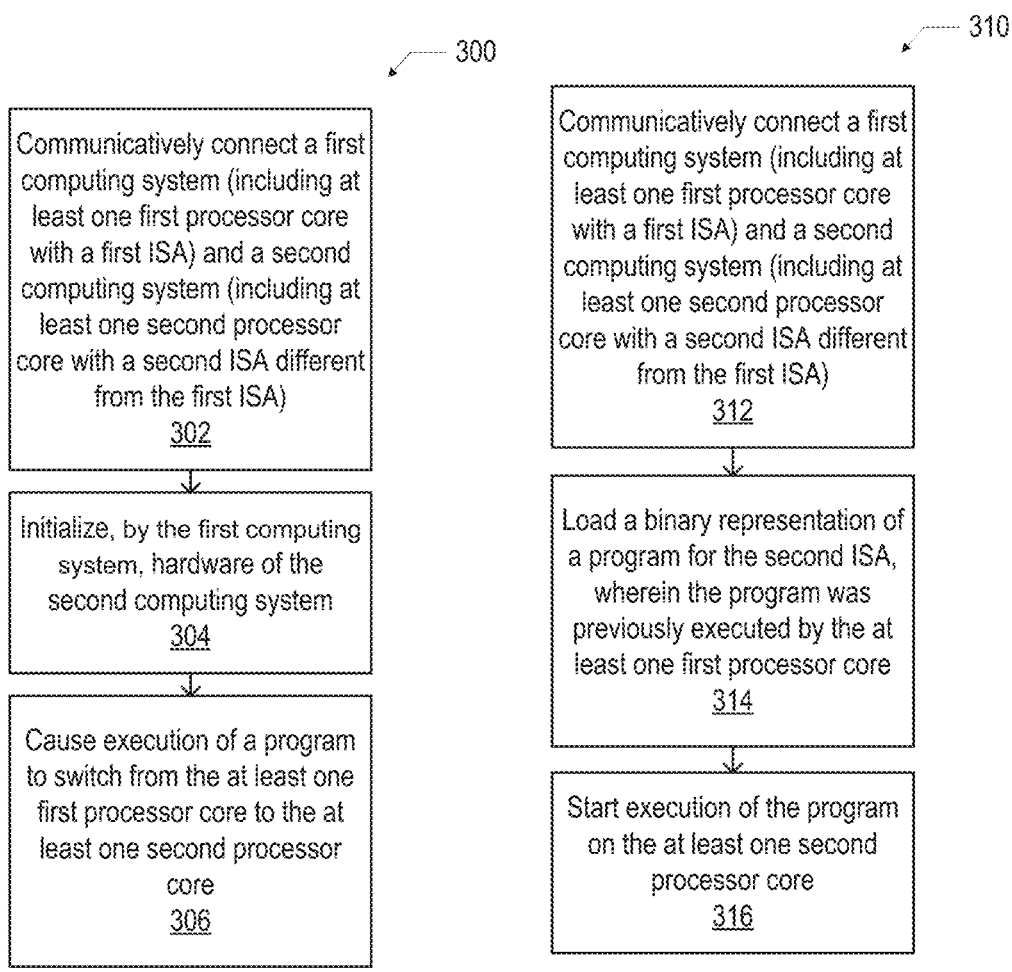

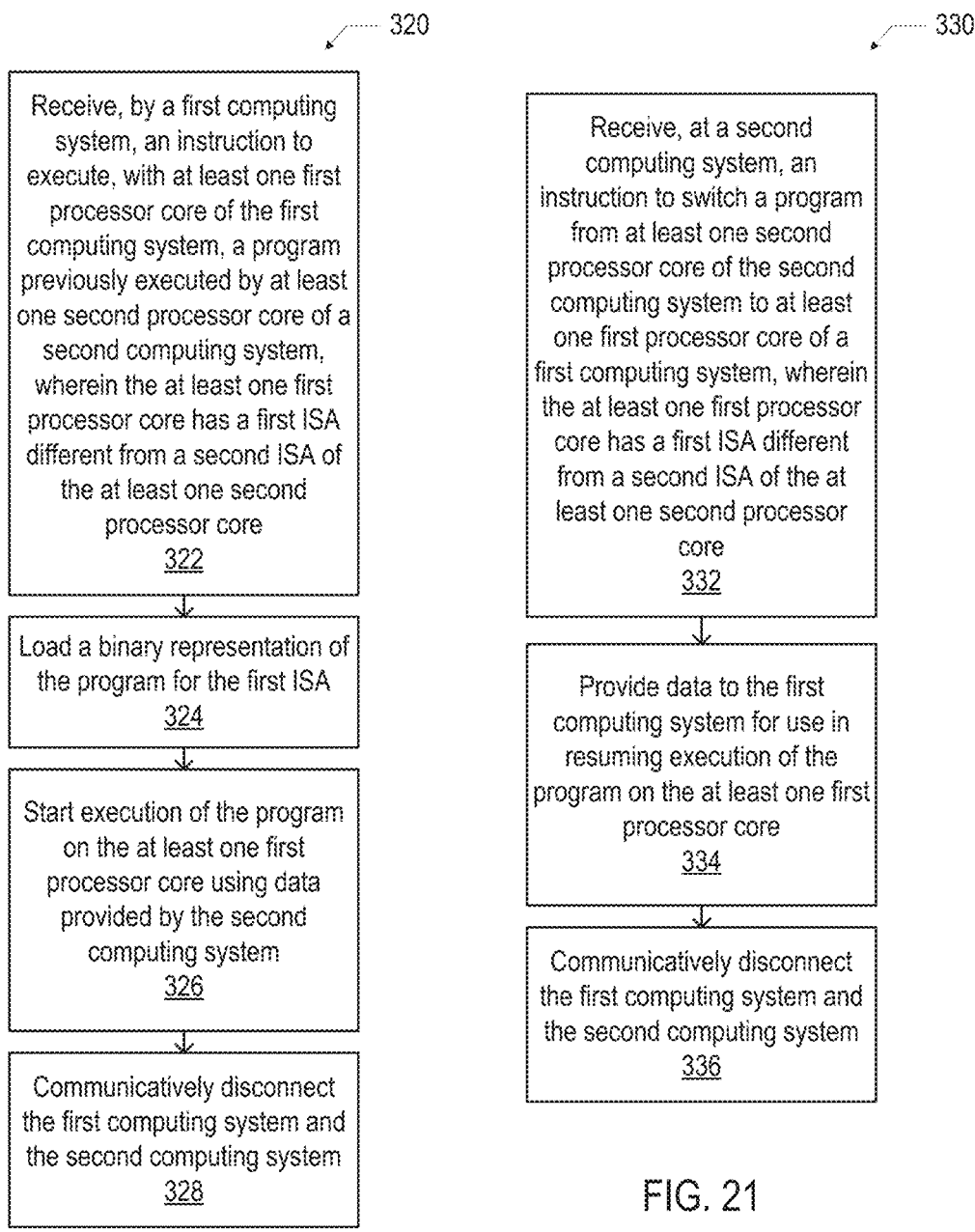

SYSTEMS AND METHODS FOR MULTI-ARCHITECTURE COMPUTING

BACKGROUND

Data centers include collections of computing resources that service the requests of client devices. These client devices are often remote, communicating their requests over an intervening communications network.

BRIEF SUMMARY OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 5 illustrates the generation of a binary executable from a multi-architecture binary executable, in accordance with various embodiments.

FIG. 6 is a flow diagram of an illustrative method of compiling and assembling a file in a multi-architecture computing system, in accordance with various embodiments.

FIG. 7 is a flow diagram of an illustrative method of generating a multi-architecture binary executable, in accordance with various embodiments.

FIG. 8 is a flow diagram of an illustrative method of loading a binary executable from a multi-architecture binary executable, in accordance with various embodiments.

FIG. 15 is a flow diagram of an illustrative method of switching operation of a program from a processor core with one ISA to a processor core with a different ISA, in accordance with various embodiments.

FIG. 16 is a flow diagram of an illustrative method of translating data structures compatible with one ISA to data structures compatible with another ISA in a multi-architecture computing system, in accordance with various embodiments.

FIG. 17 is a flow diagram of an illustrative method of signaling a switch in the execution of a program from one processor core to another processor core using a different operating system, in accordance with various embodiments.

FIGS. 18-19 are flow diagrams of illustrative methods of combining computing resources to form a multi-architecture computing system, in accordance with various embodiments.

FIGS. 20-21 are flow diagrams of illustrative methods of removing computing resources from a multi-architecture computing system, in accordance with various embodiments.

DETAILED DESCRIPTION

Disclosed herein are systems and techniques for enabling collaboration between processing devices (e.g., processor cores) having different instruction set architectures (ISAs) into a single computing system. Some of the embodiments disclosed herein may use data representations (e.g., in-memory binary formats, in-memory data structures, register content, and on-stack data) that are portable and/or translatable between different ISAs. Various embodiments disclosed herein may provide data center owners with flexibility in job scheduling, power efficiency, and cost savings that could not be previously achieved.

In the following detailed description, reference is made to the accompanying drawings that form a part hereof wherein like numerals designate like parts throughout, and in which is shown, by way of illustration, embodiments that may be practiced. Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. For ease of illustration, the term "FIG. 1" may be used to refer to the collection of drawings of FIGS. 1A-1C.

As used herein, the term "logic" may refer to, be part of, or include an application specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide/s the described functionality. The accompanying drawings are not necessarily drawn to scale. As used herein, the phrase "likely to" may refer to a condition in which one or more threshold tests or other indicators are present for the potential occurrence of an event.

Figure 1A:
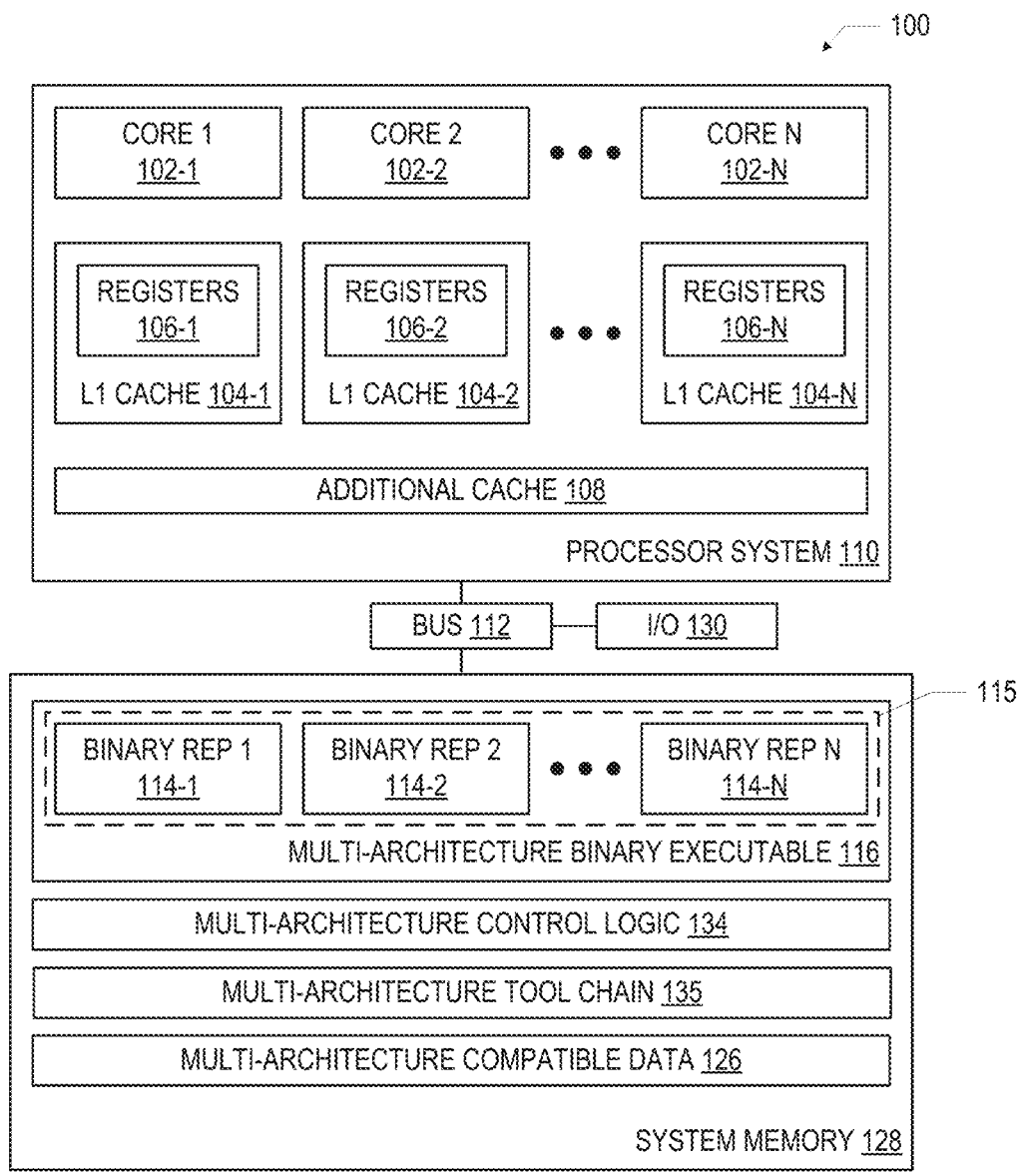
FIG. 1A is a block diagram of a multi-architecture computing system, in accordance with various embodiments.

FIG. 1A is a block diagram of a multi-architecture computing system 100, in accordance with various embodiments. The computing system 100 may include a processor system 110, a system memory 128, and a bus 112 through which the processor system 110 in the system memory 128 may communicate. The computing system 100 may also include input/output (I/O) interfaces and/or devices 130. The I/O interfaces and/or devices 130 may include any suitable I/O devices and/or interfaces, such as any of the I/O devices and/or interfaces discussed below with reference to FIG. 25.

The components of the computing system 100 may be distributed among one or more distinct computing devices (e.g., computing devices included in different housings, or generally separately operable). For example, in some embodiments, some portion of the computing system 100 may be provided by a personal computing device, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultra-mobile personal computer, etc.), a desktop computing device, a set-top box or other entertainment control unit (e.g., within a television housing along with a tuner, or separately housed from a television tuner), a digital camera, or a wearable computing device (e.g., a watch or pair of eyeglasses). A personal computing device may include wireless communication capability and one or more input devices for receiving inputs from a human user (e.g., a touchscreen). In some embodiments, some portion of the computing system 100 may be provided by a server or other networked computing component, a printer, a scanner, a monitor, or a vehicle control unit. Examples of such embodiments are discussed below with reference to FIG. 1B. In some embodiments, the computing system 100 may include a server (e.g., a monolithic or disaggregated server). For example, the computing system 100 may be a server in a data center, and may be one of many multi-architecture computing systems 100 acting as servers in the data center, as discussed below with reference to FIG. 1C.

The processor system 110 may include multiple processor cores 102. At least two of the processor cores 102 included in the processor system 110 may have different ISAs. In the example computing system 100 illustrated in FIG. 1A, N different processor cores 102 are illustrated (identified as processor cores 102-1, 102-2, . . . , 102-N), and each of these processor cores 102 may have a different ISA. Note that, although only a single processor core 102-1 is illustrated, multiple processor cores having the same ISA as the processor core 102-1 may be included in the processor system 110; similarly, multiple processor cores having the same ISA for any particular ISA may be included in the processor system 110. For example, two processor cores 102 having the same ISA as the processor core 102-1 may be included in the processor system 110, four processor cores having the same ISA as the processor core 102-2 may be included in the processor system 110, etc. As used herein, the notation "processor core 102-K" may be used to refer to a processor core having an ISA "K" (which may be, for example, any ISA). As used herein, the notation "processor core 102-K" and "processor core 102-J" may be used to refer to processor cores having two different ISAs ("K" and "J," respectively). In some embodiments, the processor system 110 may include one or more central processing units (CPUs) having multiple processor cores 102, or different combinations of the processor cores 102 may provide different CPUs.

The ISAs associated with different processor cores 102 may include any suitable ISA, and the processor system 110 may represent any desired combination of ISAs. Two different ISAs may have sets of operation codes (opcodes) that are not the same, nor is the set of opcodes for one of the ISAs a subset of the set of opcodes for the other ISA. An ISA may specify how and where operands are stored, how many operands are named in an instruction, what operations are available, and/or the type and size of operands.

In some embodiments, one or more of the processor cores 102 may have a complex instruction set computing (CISC) ISA. In some embodiments, one or more of the processor cores 102 may have a reduced instruction set computing (RISC) ISA. A processor core 102 with a CISC ISA may be a higher-performance processor core, and a processor core 102 with a RISC ISA may be a lower performance core; thus, shifting data processing tasks between them may enable the multi-architecture computing system 100 to flexibly respond to demand and improve power consumption. In some embodiments, one or more of the processor cores 102 may have an ISA with an endianness (the order of bits of a digital value in memory) that is different from an endianness of an ISA of one or more of the other processor cores 102. In some embodiments, one or more of the processor cores 102 may have an ISA with a word size that is different from a word size of an ISA of one or more of the other processor cores 102. In some embodiments, one or more of the processor cores 102 may have an ISA whose address space differs from an address space of an ISA of one or more of the other processor cores 102 (e.g., by having different numbers of bits in an address and/or by having different data storage layouts for a same operating system). In some embodiments, one or more of the processor cores 102 may have an ISA that can process a first number of operands in a single instruction, and one or more of the other processor cores 102 may have an ISA that can process a second, different number of operands in a single instruction (e.g., 3 versus 2). Examples of ISAs include Alpha, Blackfin, SPARC, x86, x86-64, AVR32, AArch64, 68k, FR-V, Hexagon, PA-RISC, H8, IBM, M32R, Microblaze, MN103, Open RISC, Power, ARC, PowerPC, SuperH, ARM (32- and 64-bit), MIPS, and Intel architectures (e.g., IA-32, IA-64, and Intel 64); any of these ISAs may be associated with different processor cores 102 in the multi-architecture computing system 100.

Each of the processor cores 102 may have an associated level 1 (L1) cache 104. Registers 106 associated with a particular processor core 102 may be included in the L1 cache 104 associated with that processor core 102, as illustrated in FIG. 1A. The processor system 110 may include additional cache 108, which may include additional cache storage assigned to different processor cores 102, additional cache storage shared by different processor cores 102, or both.

In some embodiments, the system memory 128 may provide a memory space for one or more different processor cores 102 in the processor system 110. In some embodiments, the system memory 128 may provide a coherent memory space for multiple different processor cores 102 in the processor system 110. For example, in some embodiments, multiple ones of the processor cores 102 may be able to access the system memory 128 (e.g., via the bus 112), and any suitable coherency protocol may be employed to notify all of the processor cores 102 of changes to shared values. A coherency protocol may be strict or relaxed, in various embodiments.

In some embodiments, the system memory 128 may be provided by different memory devices, and different subsets of the processor cores 102 may access different ones of the memory devices. When components of the computing system 100 are distributed across different computing systems (e.g., systems that may not share a bus 112 with each other, as discussed below with reference to FIGS. 1B and 1C), communication between the different computing systems may take place via the I/O interfaces and/or devices 130 (e.g., via a network interface provided by one or more communication chips 2012, as discussed below with reference to FIG. 25, or in accordance with other examples discussed herein).

In some embodiments, the system memory 128 may include a multi-architecture binary executable 116. The multi-architecture binary executable 116 may include data for multiple binary representations 114. Different binary representations 114 included in the multi-architecture binary executable 116 may correspond to different ISAs (and therefore different processor cores 102). FIG. 1A, for example, illustrates binary representations 114-1, 114-2, ..., 114-N. The different binary representations 114 may all represent a common program 115 (abstractly indicated by the dashed line in FIG. 1A) such that execution of the binary representation 114-J by the processor core 102-J may result in the performance of the same set of tasks as execution of the binary representation 114-K by the processor core 102-K.

As used herein, a "program" may refer to any suitable set of operations, and may include an application (e.g., the applications 136 discussed below with reference to FIG. 2), a virtual machine (e.g., the virtual machines 133 discussed below with reference to FIG. 2), or a container (e.g., as the containers 141 discussed below with reference to FIG. 2). In some embodiments, a program may be associated with a particular set of source code. For ease of discussion, all of the binary representations 114 discussed herein are assumed to correspond to a same single program 115, but any of the multi-architecture computing systems 100 disclosed herein may include multiple such sets of binary representations 114, representing multiple different programs 115, each of which may be executed by multiple processor cores 102. Thus, any of the multi-architecture computing systems 100 disclosed herein may hand off operation of multiple programs 115 between different combinations of processor cores 102 having different ISAs.

In some embodiments, the different binary representations 114 may be included in the multi-architecture binary executable 116 as different executable and linkable format (ELF) sections. Each of the ELF sections may have a different name (included in the section header) identifying the ISA corresponding to the binary representation 114 in that section. When the multi-architecture binary executable 116 is loaded (e.g., by a dynamic loader, as discussed below with reference to FIG. 5), the ISA of the processor core 102 on which the program 115 is to be run may be identified, and the binary representation 114 included in the ELF section corresponding to that ISA may be selectively loaded and executed (without executing the binary representations 114 in the ELF sections corresponding to other ISAs). In this manner, the multi-architecture binary executable 116 may be selectively loaded to execute on multiple different ISAs.

In some embodiments, the different binary representations 114 may be included in the multi-architecture binary executable 116 as differently named functions for each ISA. For example, the multi-architecture binary executable 116 may include multiple different "main" functions for each of the different ISAs (e.g., one "main" function titled "ISA1_main," another titled "ISA2_main," etc.). At load time, the dynamic loader 160 may use only the functions whose names correspond to the target ISA. This approach may be used alternatively to, or in conjunction with, different ELF sections for different ISAs.

In some embodiments, different binary representations 114 representing the same program 115 may not be included in a single multi-architecture binary executable 116, but may instead exist as separate, fully working binary executables. In such embodiments, the binary representation 114-1 is a binary executable that is compatible with the ISA of the processor core 102-1 and representative of the program 115, the binary representation 114-2 is a binary executable that is compatible with the ISA of the processor core 102-2 and representative of the program 115, etc. Using separate, fully working binary executables for the different binary representations 114, instead of using a multi-architecture binary executable 116, may put less of the processing workload on the multi-architecture linker 154 (an "offline" component, discussed below) and more on the dynamic loader 160 (an "online" component, discussed below), and may be particularly appropriate when the computing system 100 supports a large number of ISAs but only a small subset is expected to run a particular program 115. In some embodiments, when some of the computing system 100 is distributed among different computing devices (e.g., with separate memory devices), a particular binary representation 114 associated with a particular processor core 102 (e.g., compatible with the ISA of the particular processor core 102) may be stored in a memory device "local" to that processor core 102 (e.g., in a memory device with which the processor core 102 may communicate via a bus 112).

In some embodiments, the system memory 128 may store multi-architecture compatible data 126. The multi-architecture compatible data 126 may be data generated and/or used by the execution of a program 115 on a processor core 102-K that is compatible with (e.g., may be read by) the same program 115 executing on a processor core 102-J. For example, the multi-architecture compatible data 126 may have an endianness and word size that allows it to be correctly interpreted by processor cores 102 having different ISAs. For example, compatibility between 32- and 64-bit ISAs may be achieved by padding or splitting 64-bit variables into two 32-bit ones. Endianness may be addressed by demarcating compatible structure boundaries and performing appropriate conversion operations on access. In some embodiments, the multi-architecture compatible data 126 may be addressed so that the data may be correctly interpreted by processor cores 102 having different ISAs. For example, when different ISAs have address space differences, offset calculations and layout translations may be used to generate a multi-architecture compatible address space representation. The in-memory representation of the multi-architecture compatible data 126 may thus be compatible with multiple ISAs.

In some embodiments, some of the multi-architecture compatible data 126 may only be compatible with a subset of the ISAs represented in the processor system 110. For example, if the processor system 110 includes processor cores 102 that, among them, represent ISAs A, B, and C, some of the multi-architecture compatible data 126 may be compatible with the ISAs A and B but not C, some of the multi-architecture compatible data 126 may be compatible with the ISAs B and C but not A, some of the multi-architecture compatible data 126 may be compatible with the ISAs A and C but not B, and some of the multi-architecture compatible data 126 may be compatible with the ISAs A, B, and C. What portions of the multi-architecture compatible data 126 are compatible with which ISAs may depend on which processor cores 102 will be transferring handling of the program 115 between them. For example, if a particular program 115 will be handled only by the processor cores 102-J and 102-K, the multi-architecture compatible data 126 associated with the operation of the program 115 may be compatible with at least the ISAs J and K (and perhaps no other ISAs). Thus, the ISA compatibility of data associated with a program 115 may be different for different programs 115. When the system memory 128 is provided by multiple different memory devices, different portions of the multi-architecture compatible data 126 may be stored in different ones of the memory devices. For example, in some embodiments, a portion of the multi-architecture compatible data 126 generated or used by a particular processor core 102 may be stored in a memory device local to the particular processor core 102.

The different binary representations 114 (e.g., included or not included in the multi-architecture binary executable 116) may utilize the multi-architecture compatible data 126 so that execution of the program 115 may be handed off between different ones of the processor cores 102 (each executing their associated binary representation 114). Handing off execution of a program between different processor cores has traditionally been limited to processor cores having the same ISA (and, therefore, the same data structure requirements, address space arrangements, etc.). The systems and techniques disclosed herein may enable entirely new ways of using processor cores (e.g., in a data center or mobile computing environment) to achieve greater flexibility, increased computational efficiency, reduced power consumption, and/or other benefits not achievable with traditional approaches.

In some embodiments, the system memory 128 may include multi-architecture control logic 134. The multi-architecture control logic 134 may be responsible for scheduling transfer of execution of the program 115 from one processor core 102 to another processor core 102 and supporting the transfer of execution of the program 115 by, for example, generating data about the state of the program 115 as it suspends on one processor core 102 before it is resumed by another processor core 102. The multi-architecture control logic 134 may also control the loading of the binary representations 114 (e.g., in the form of a multi-architecture binary executable 116). Examples of multi-architecture control logic 134 are discussed in detail below (e.g., with reference to FIGS. 3, 5 and 8-13). In some embodiments, the multi-architecture control logic 134 may cause the execution of the binary representation 114-J on the associated processor core 102-J to suspend and may cause the execution of the binary representation 114-K on the associated processor core 102-K to begin; the execution of the binary representation 114-J may use and/or generate some of the multi-architecture compatible data 126, and the execution of the binary representation 114-K may use and/or generate some of the multi-architecture compatible data 126. For example, multi-architecture compatible data 126 used or generated by the binary representation 114-J may be used by the binary representation 114-K during execution. When the system memory 128 is provided by multiple different memory devices, different portions of the multi-architecture control logic 134 may be stored in different ones of the memory devices. For example, in some embodiments, a portion of the multi-architecture control logic 134 used by a particular processor core 102 may be stored in a memory device local to the particular processor core 102.

In some embodiments, the multi-architecture control logic 134 may transfer control of a program 115 between a processor core 102-J and a processor core 102-K, wherein the processor core 102-J and the processor core 102-K have different baseline power consumption (e.g., the processor core 102-J is a higher-performance processor core, and therefore consumes more power than the processor core 102-K). Handing off programs 115 between such processor cores 102-J and 102-K may enable the multi-architecture computing system 100 to respond to changes in demand on the multi-architecture computing system 100 (e.g., from client devices 186, as discussed below with reference to FIG. 1C). For example, in some embodiments, the multi-architecture computing system 100 may provide, among other things, a customer-facing program 115 (e.g., serving a webpage, providing a network service, etc.). When demand for the program 115 is low (e.g., below a designated threshold), the multi-architecture control logic 134 may assign execution of the program 115 to the lower-power (and thus lower performance) processor core 102-K. If demand for the program 115 becomes high (e.g., above a designated threshold), the multi-architecture control logic 134 may hand off execution of the program 115 to the higher-power (and thus higher-performance) processor core 102-J; the multi-architecture control logic 134 may hand the program 115 back to the processor core 102-K if the demand for the program 115 becomes low again. Additional examples are discussed below.

In some embodiments, the system memory 128 may include a multi-architecture toolchain 135. The multi-architecture toolchain 135 may control the generation of the binary representations 114 (e.g., in the form of a multi-architecture binary executable 116), and may include a preprocessor, compiler, assembler, and linker (e.g., as discussed below). The multi-architecture toolchain 135 may include a set of programming tools that may be used (e.g., in sequence or in another relative arrangement) to generate different binary representations 114 of the program 115. Although FIG. 1A illustrates the multi-architecture toolchain 135 as part of the system memory 128 of the multi-architecture computing system 100, the multi-architecture toolchain 135 may not be part of the multi-architecture computing system 100, but may instead be used on a separate computing system, such as the development computing system 137 (e.g., as illustrated below with reference to FIGS. 1B and 1C). In such embodiments, the multi-architecture toolchain 135 may operate on this separate computing system to generate the binary representations 114, and then these binary representations 114 may be installed in the system memory 128 of the multi-architecture computing system 100 (e.g., by using a transportable computer readable media having the binary representations 114 thereon to bring the binary representations from the separate computing system to the multi-architecture computing system 100, or by using a network or other computer-to-computer connection to transfer the binary representations 114 to the multi-architecture computing system 100). Generally, a development computing system 137 may be a computing system on which programs and other software tools are created for use in the computing systems 100. A development computing system 137 may be remote from or otherwise entirely separate from the computing system 100. In some embodiments, because the development computing system 137 may be used to perform compilation and other processing of complex software, the development computing system 137 may be a higher-performance computing system than some or all of the computing system 100. In some embodiments, the source code for the programs 115 may only be available on or to the development computing system 137 (and not the rest of the computing system 100).

As noted above, in some embodiments, the computing system 100 may be distributed among different computing systems (e.g., computing systems that do not communicate with each other via a bus like the bus 112, but instead communicate via a wired or wireless computer network). For example, FIG. 1A is a block diagram of an embodiment of the computing system 100 including a single-architecture computing system 100A and a one-or-more-architecture computing system 100B coupled by a communication link 117. The computing system 100A may include a single-architecture processor system 110A; the processor system 110A may include one or more processor cores 102 that all share a single ISA. The system memory 128 of the computing system 100A may include a single binary representation 114A that is compatible with the ISA of the processor system 110A. The system memory 128 of the computing system 100A may include some or all of the multi-architecture control logic 134 and/or the multi-architecture compatible data 126 as appropriate for the operations to be performed by the computing system 100A (examples of which are discussed further herein).

Figure 1B:
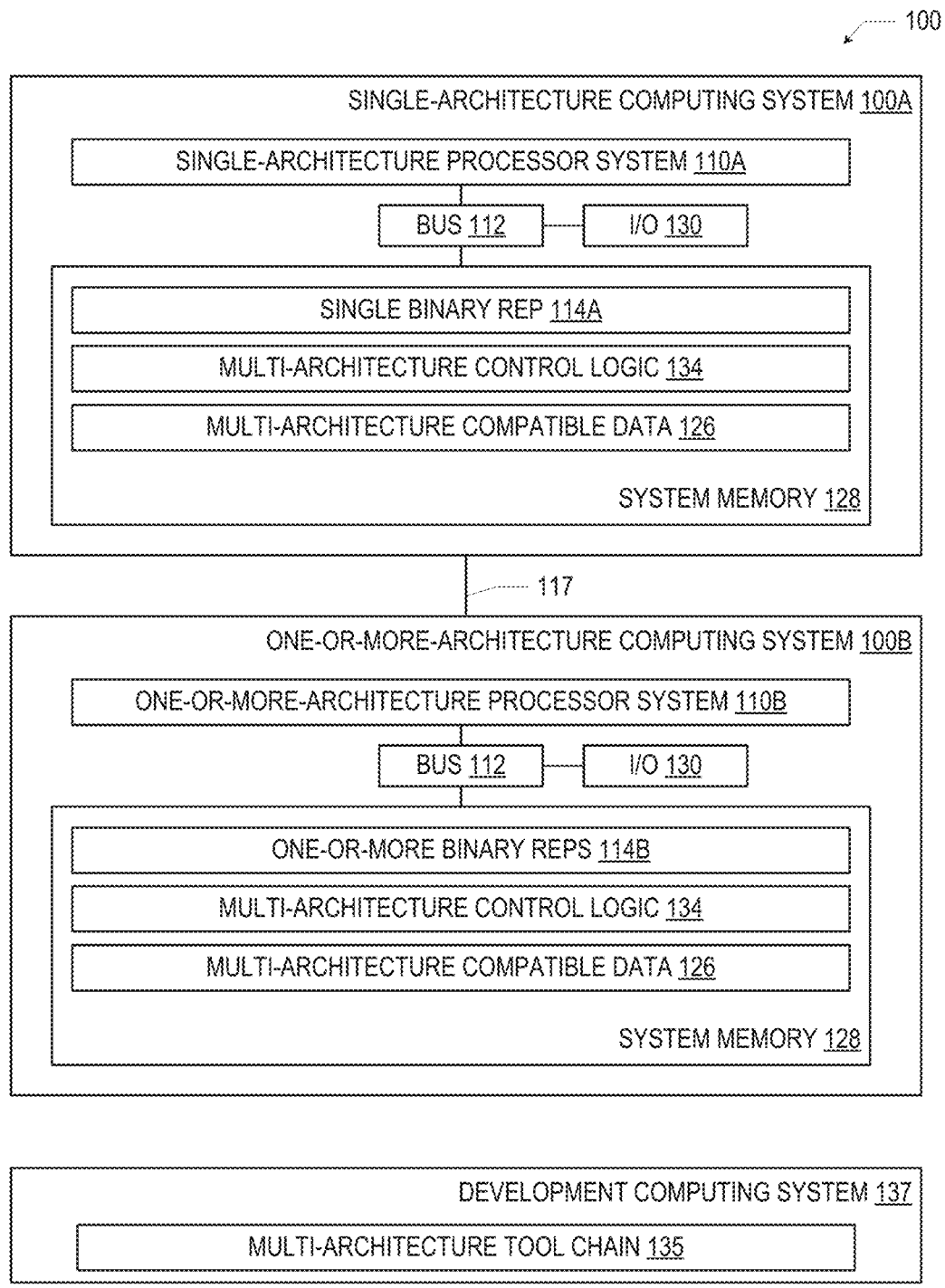
FIG. 1B is a block diagram of an embodiment of the multi-architecture computing system of FIG. 1A, including a single-architecture computing system and a one-or-more-architecture computing system, in accordance with various embodiments.

The computing system 100B of FIG. 1B may include a one-or-more-architecture processor system 110B; the processor system 110B may include one or more processor cores 102 that, among them, represent one or more ISAs. The ISA associated with the computing system 100A may be different from the one or more ISAs associated with the computing system 100B, and thus together the computing systems 100A and 100B may provide a multi-architecture computing system 100. The system memory 128 of the computing system 100B may include one or more binary representations 114B, each of which are compatible with different ones of the one or more ISAs of the processor system 110B. The system memory 128 of the computing system 100B may include some or all of the multi-architecture control logic 134 and/or the multi-architecture compatible data 126 as appropriate for the operations to be performed by the computing system 100B (examples of which are discussed further herein). The computing system 100 of FIG. 1B may also include a development computing system 137, in accordance with any of the embodiments discussed above.

The computing systems 100A and 100B of FIG. 1B may exchange data via a communication link 117. The communication link 117 may be wired communication link, a wireless communication link, and optical communication link, an electrical communication link, and/or any suitable combination. In some embodiments, the communication link 117 may support communications in accordance with any of the communication protocols discussed below with reference to the communication chip 2012 of FIG. 25. The choice of an appropriate communication link 117 may depend on the nature of the communications between the computing system 100A and the computing system 100B. For example, a WiFi or WiGig communication link 117 may be appropriate for programs 115 that can tolerate higher latencies, while a wired Ethernet, high performance computing (HPC) interconnect (e.g., part of a HPC fabric), or other wired communication link 117 may be appropriate for programs 115 in which lower latencies are needed or desired.

In some embodiments, the computing system 100A and the computing system 100B may be selectively connected by a wired or wireless link to form a multi-architecture computing system 100. For example, the computing system 100A may be a personal computing device (e.g., a tablet, laptop, smart phone, or other mobile computing device), and the computing system 100B may be a docking station that has a socket into which a corresponding socket of the computing system 100A may connect (e.g., as part of the communication link 117). Once the computing system 100A is seated in the docking station computing system 100B, execution of a program 115 may be moved back and forth between the processor system 110A and the processor system 110B in accordance with any of the embodiments disclosed herein. For example, if the computing system 100B supports a display device as part of its I/O devices and/or interfaces 130, display functions that would previously be performed by a display device of the computing system 100A may be migrated to the display device of the computing system 100B while the computing systems 100A and 100B are coupled. In some embodiments of this example, a display device of the computing system 100A (e.g., a touchscreen of a mobile computing device) may be used for particular notifications and/or as an auxiliary display. Other I/O functions of the computing system 100A may similarly be migrated to corresponding I/O devices and/or interfaces 130 of the computing system 100B (e.g., audio input via a microphone, audio input via speakers or a headphone jack, image capture via a camera, other sensors, etc.). Any suitable techniques may be used to facilitate the migration of desired I/O functions between the computing system 100A and the computing system 100B. For example, migration of display functions may be achieved by using a remote frame buffer-based technique such as Remote Desktop Protocol, or by using a client-server technique such as the X Window System. In other embodiments, no display and/or other I/O devices and/or interfaces 130 may be migrated (even when processing tasks are migrated, as discussed below).

The execution of a program 115 by the processor system 110A may be switched over to the processor system 110B, in accordance with any of the techniques disclosed herein. When the computing system 100A is disconnected from the computing system 100B (e.g., by pressing a mechanical eject button to decouple the corresponding sockets), the program execution that had been switched to the processor system 110B may be switched back to the processor system 110A. Further examples of such embodiments are discussed below (e.g., with reference to FIGS. 18-21). Any of the embodiments discussed with reference to a docking station implementation of the computing system 100B may also be implemented by any suitable wired connection (e.g., connecting the computing system 100A and the computing system 100B with an appropriate cable) or wireless connection between the computing systems 100A and 100B.

Figure 1C:
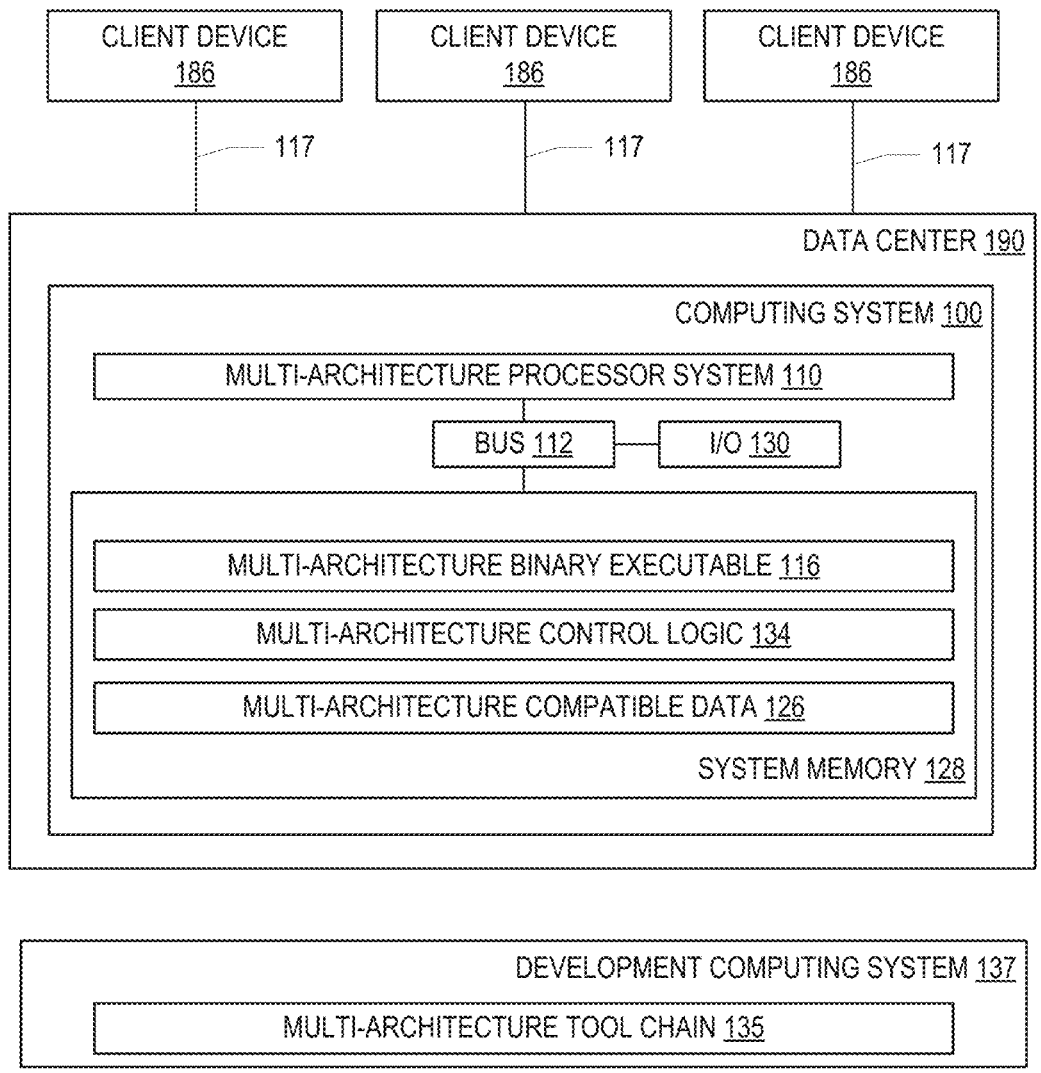
FIG. 1C is a block diagram of an embodiment of the multi-architecture computing system of FIG. 1A in a data-center environment, in accordance with various embodiments.

In some embodiments, the multi-architecture computing systems 100 disclosed herein may be used in a data center application. For example, FIG. 1C is a block diagram of a computing system 100 implemented in a data center 190. The computing system 100 of FIG. 1C may take any of the forms disclosed herein, and the data center 190 may be in communication with one or more client devices 186 via communication links 117, in accordance with various embodiments. The communication links 117 may take any suitable form (e.g., as discussed above with reference to FIG. 1B), and may include the internet, a wired network, a wireless network, or any combination of communication networks. The data center 190 may also include computing systems that are not multi-architecture computing systems (not shown), in addition to the multi-architecture computing system 100. In some embodiments, the computing system 100 may be implemented by multiple racks of circuit boards including different processor cores 102 and system memory 128. These racks may be geographically co-located (e.g., in a common building), or geographically distributed (and connected by suitable communication links). Although a particular number of client devices 186 is shown in FIG. 1C, this is simply for illustration. FIG. 1C also includes a development computing system 137 (separate from or a part of the data center 190), in accordance with any of the embodiments discussed above.

The embodiments of the computing systems 100 illustrated in FIGS. 1B and 1C may be used to distribute the execution of a program 115 between different computing devices in different ways. For example, the computing system 100 may be used to migrate the execution of a program 115 from a less powerful personal computing device (e.g., a mobile computing device) to a data center. In some such embodiments, the personal computing device may be the computing system 100A and the data center may be the computing system 100B of FIG. 1B; the execution of a program 115 may be switched between the processor system 110A and the processor system 110B in accordance with any of the techniques disclosed herein. In other embodiments in which the computing system 100 is used to migrate the execution of a program 115 from a personal computing device to a data center, the personal computing device may be a client device 186 and the data center may be the data center 190 of FIG. 1C; the client device 186 may send the data needed for a program 115 to run at the data center 190, and the data center 190 may switch execution of the program 115 between multiple different processor cores in the multi-architecture processor system 110. Examples of programs 115 that may be valuable to migrate include those in which more processing power than can be provided by the personal computing device is desired, such as programs including computationally intensive tasks like MapReduce, graphics processing, neural network or genetic algorithm execution, voice analysis, any particular memory or storage intensive tasks, etc. Other programs 115 that may be valuable to migrate are those for which the personal computing device does not have the resources to perform. For example, the personal computing device may be a set-top box, and may offload program 115 that records a television program to a data center 190 when its own tuners are turned off or otherwise busy, in accordance with the embodiments disclosed herein In another example, the computing system 100 may be used to migrate programs 115 from and/or to a personal computing device in anticipation of the personal computing device losing its communication link with another (e.g., more powerful) computing device, such as a docking station, desktop computing device, or data center. In some such embodiments, the personal computing device may be the computing system 100A and the other computing device may be the computing system 100B; the execution of a program 115 may be switched between the processor system 110A and the processor system 110B if it is expected that communication may be lost between the processor system 110A and the processor system 110B. In other embodiments in which the computing system 100 is used to migrate programs 115 between the personal computing device and the other computing device in anticipation of a connection loss, the personal computing device may be a client device 186 and the other computing device may be the data center 190 of FIG. 1C; the client device 186 or the data center 190 may send the data needed for a program 115 to continue running in anticipation of a connection loss.

Whether the personal computing device or the other computing device is the one to which the program 115 is switched may depend on the particular program 115. For example, if a mobile computing device is initiates a voice analysis program 115, and offload that program 115 to a data center, the data center may wish to return the partial or complete results (and also transfer execution of the program 115) back to the mobile computing device if the mobile computing device or the data center determines that a connection loss is likely. In another example, if a laptop computing device is performing image processing on a remote image database, the laptop computing device may wish to transfer the image processing program 115 to a data center if the laptop computing device determines that a connection loss is likely.

Determining whether a connection loss is likely may be performed using any suitable technique. For example, the personal computing device or the other computing device may determine that the personal computing device is approaching the boundary of a known geofence that governs the use of the program 115 or network connectivity, and that once the personal computing device crosses the boundary of the geofence, the communication link will be lost. As used herein, a "geofence" may include a virtual geographic boundary that may enable the computing system 100 to trigger a response when a computing device enters or leaves a particular area. In some embodiments, a geofence may be defined by GPS, RFID, Bluetooth, WiFi, or other technologies that may be used to locate or approximately locate a computing device. Having the personal computing device go within a threshold distance of the geofence may trigger the expectation of a connection loss, for example. In another example, a user of the personal computing device may set the personal computing device in an "airplane" or "offline" mode; this setting may trigger a switch in whether the personal computing device or the other computing device continues to execute the program 115 (with the switch taking place before the personal computing device enters the offline mode). In another example, the personal computing device or the other computing device may detect that a battery level (e.g., charge remaining) or other power supply available to the personal computing device has reached a low threshold, and thus that the communication link between the personal computing device and the other computing device is likely to be lost; detecting this "low battery" condition may trigger a switch in whether the personal computing device or the other computing device continues to execute the program 115. In another example, the personal computing device or the other computing device may detect that a physical coupling between the personal computing device and the other computing device (e.g., via a docking station or cable) is about to be disconnected (e.g., because a mechanical unseat button has been pushed, or the movement of a cable and a socket is detected) and thus that the communication link between the personal computing device and the other computing device is likely to be lost; detecting this physical disconnect condition may trigger a switch in whether the personal computing device or the other computing device continues to execute the program 115. Further examples of such embodiments are discussed below (e.g., with reference to FIGS. 22-23).

Figure 2:
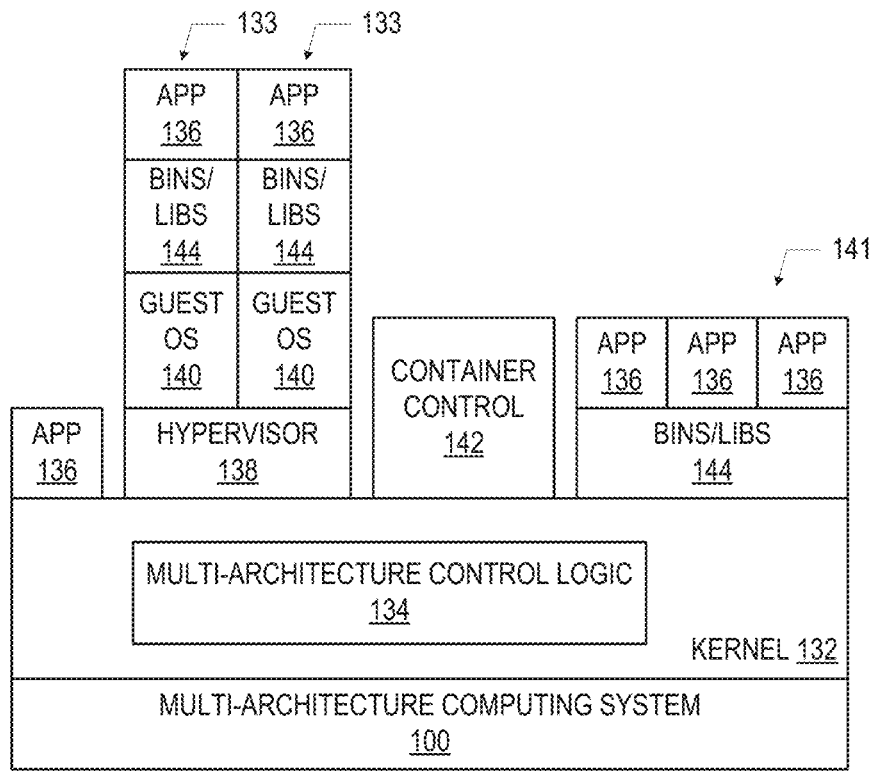
FIG. 2 is a diagram illustrating example programs that may execute on the multi-architecture computing systems disclosed herein, in accordance with various embodiments.

FIG. 2 is a diagram illustrating example programs 115 that may execute on the multi-architecture computing systems 100 disclosed herein, in accordance with various embodiments. In particular, FIG. 2 provides examples of the kinds and hierarchy of logic that may execute on the hardware of the computing system 100, and illustrates a number of different types of programs that may run on a multi-architecture computing system 100 (e.g., serving as the program 115). The programs illustrated in FIG. 2 include an application 136 running on the kernel 132, a virtual machine 133, and a container 141; any of these programs may serve as the program 115, and any combination of one or more of these programs may run on the multi-architecture computing system 100, and may be passed between multiple processor cores 102 as disclosed herein. Generally, the multi-architecture computing system 100 may run virtual functions, applications, workloads, and data storage and collection processes (e.g., in conjunction with other multi-architecture computing systems 100 in a data center, as discussed above with reference to FIG. 1C).

A kernel 132 of an operating system (OS) may execute on the computing system 100; in some embodiments, the multi-architecture control logic 134 may be implemented as part of the kernel 132. The kernel 132 may be a multi-architecture binary, and may be loaded by the computing system 100 with a dynamic loader executing N different times with a different set of library binaries for each ISA in order to load N kernel images, each associated with a different one of the N ISAs. One boot segment may be shared among the different kernel images. As shown, an application 136 may run within the OS of the kernel 132. The application 136 may include any kind of data processing (e.g., image processing, audio processing, text processing, mathematical processing, machine learning, and/or simulation), communication (e.g., network communication, voice or video communication), storage, or other kind of application.

In some embodiments, one or more virtual machines 133 may run on the multi-architecture computing system 100. As known in the art, each virtual machine 133 may provide a separate instantiation of a guest OS 140, binaries/libraries 144, and applications 136 running on top of the guest OS 140. The applications 136 running in the virtual machines 133 may be any suitable application, such as video caching, transcoding, etc. In some embodiments, a virtual machine 133 may utilize a set of OpenStack Services running on a hypervisor (or virtual machine manager) 138.

In some embodiments, one or more containers 141 may run on the multi-architecture computing system 100. A container control application (e.g., a docker daemon) 142 may manage the creation and operation of the containers 141, as known in the art. A container 141 may include binaries/libraries 144 shared among one or more applications 136 running in the container 141.

Figure 3:
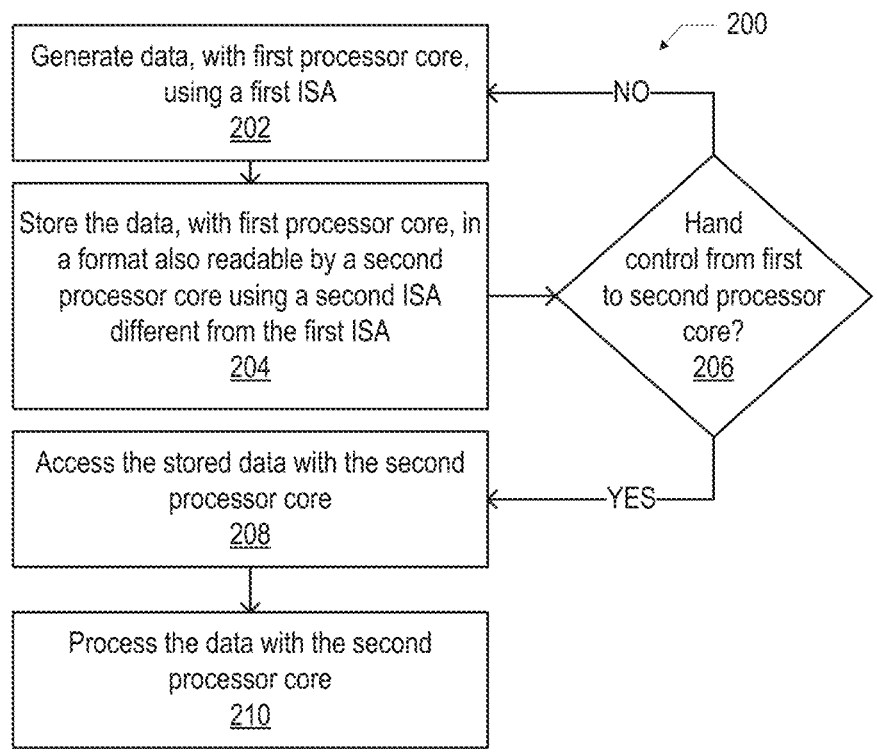
FIG. 3 is a flow diagram of an illustrative method of handling data across processor cores having different instruction set architectures (ISAs), in accordance with various embodiments.

FIG. 3 is a flow diagram of an illustrative method 200 of handling data across processor cores having different instruction set architectures (ISAs), in accordance with various embodiments. Although the operations of the method 200 may be discussed as performed by, and with respect to, various components of the multi-architecture computing system 100 of FIG. 1, the method 200 may be performed by any suitable computing system (e.g., the embodiments of FIGS. 1B and 1C).

At 202, a first processor core, using a first ISA, may generate data. The data may be any data generated by execution of a program, such as the value of variables, image or text data, settings, program state data, user data, network data, or any other data. For example, a processor core 102-K, with an ISA K, may generate data by executing a binary representation 114-K (e.g., as part of a multi-architecture binary executable 116, or as a stand-alone binary executable) corresponding to a program 115.

At 204, the first processor core may store the data in a format also readable by a second processor core having a second ISA, different from the first ISA. For example, the processor core 102-K, with an ISA K, may store the data as multi-architecture compatible data 126 in the system memory 128 so that it is readable by a processor core 102-J with an ISA J.

At 206, a determination may be made as to whether execution should be handed from the first processor core to the second processor core. For example, the multi-architecture control logic 134 may determine whether to hand operation of a program 115 from the processor core 102-K to the processor core 102-J. The multi-architecture control logic 134 may collect and store data that may be used to make the determination at 206. For example, in some embodiments, the multi-architecture control logic 134 may determine to hand operation of a program 115 from a lower-power processor core 102 to a higher-power processor core 102 upon determining that a resource demand exceeds a threshold. The resource demand may be a demand for computing cycles, complex operations, or any other resource that would be best provided by a higher-power processor core 102. For example, in some embodiments, the multi-architecture control logic 134 may determine to hand operation of a program 115 from a lower-power processor core 102 to a higher-power processor core 102 upon determining that the number of client devices 186 (discussed above with reference to FIG. 1C) requesting a service from the multi-architecture computing system 100, or that a network traffic volume, exceeds a threshold. Any other resource demand evaluation technique may be used in the determination of 206. The determination made at 206 is not limited to a resource demand evaluation, but may include any suitable criteria or conditions governing whether and when to hand control between processor cores 102 with different ISAs. Examples of other criteria or conditions disclosed herein include the connection or disconnection of two components of the computing system 100 (e.g., a computing system 100A and a computing system 100B, as discussed above with reference to FIG. 1B), an expected loss in connectivity (e.g., as discussed above), a determination that a task is better performed by a higher or lower powered processor core 102, etc.

If the determination is made at 206 that control is not to be handed to the second processor core, the method 200 may return to 202. If the determination is made at 206 that control is to be handed to the second processor core, the method may proceed to 208 and the second processor core may access the stored data. For example, the processor core 102-J may access some of the multi-architecture compatible data 126 in the system memory 128. In some embodiments, the operations performed at 208 may include suspending the execution of a program 115 on the first processor core (e.g., by suspending execution of the corresponding binary representation 114-K with the processor core 102-K).

At 210, the second processor core may process the data. For example, the processor core 102-J may execute a binary representation 114-J (e.g., as part of a multi-architecture binary executable 116, or as a stand-alone binary executable) corresponding to the program 115 to resume operation of the program 115, using some of the multi-architecture compatible data 126.

Figure 4:
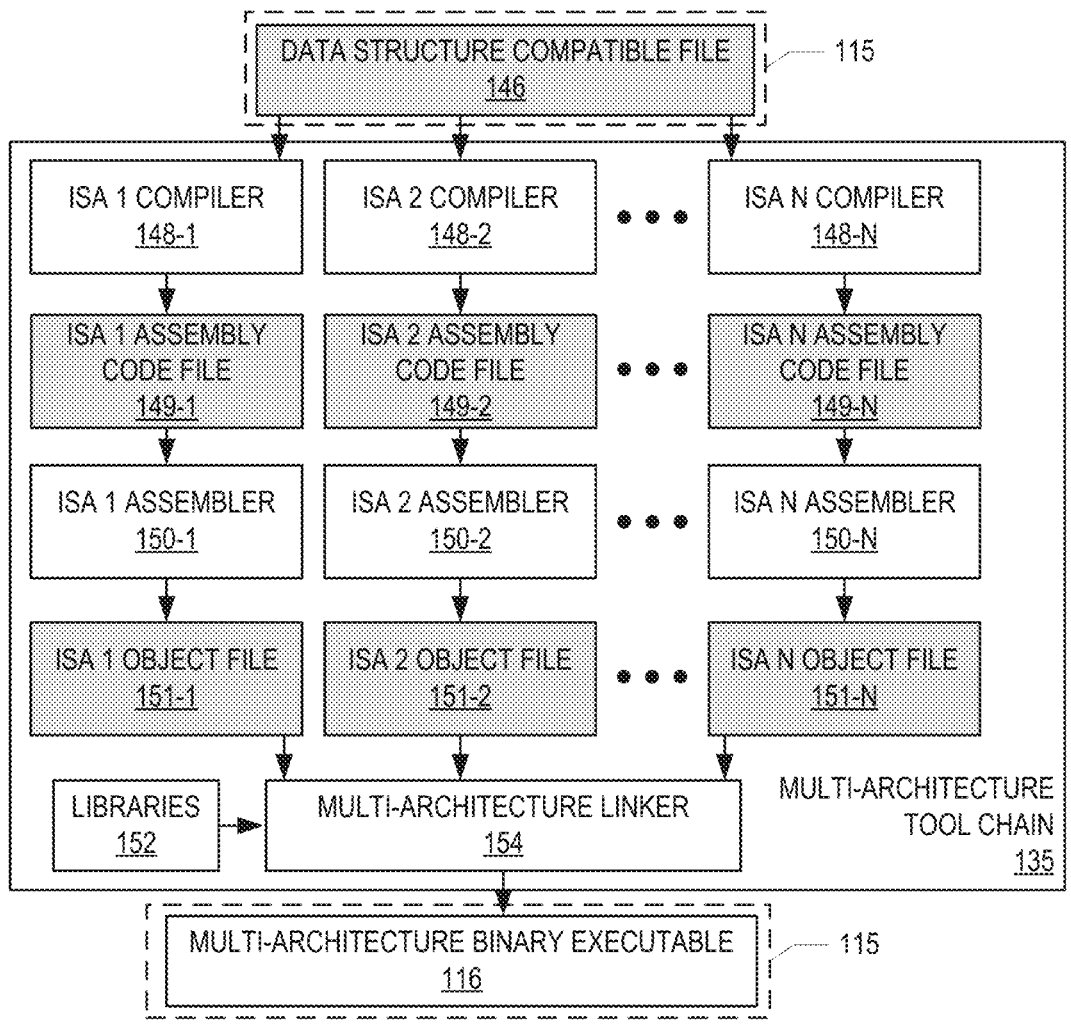
FIG. 4 illustrates example logic and techniques for the generation of a multi-architecture binary executable, in accordance with various embodiments.

As discussed above, in some embodiments of the multi-architecture computing system 100, multiple binary representations 114 representing the same program, but for different ISAs, may be included in a multi-architecture binary executable 116 stored in the system memory 128. FIG. 4 illustrates example logic and techniques for the generation of a multi-architecture binary executable 116 by the multi-architecture toolchain 135, in accordance with various embodiments. As noted above, in some embodiments, the multi-architecture toolchain 135 may be part of the computing system 100, or may be part of a separate computing system. More generally, the operations of the multi-architecture toolchain 135 may be said to be performed "offline" (as opposed to at load time of the program 115).

In particular, FIG. 4 illustrates a compiler 148 and an assembler 150 for each of the ISAs in the multi-architecture computing system. The compilers 148 and the assemblers 150 may be part of the multi-architecture toolchain 135. A data structure compatible file 146 may be provided to the compilers 148 (i.e., the ISA 1 compiler 148-1, the ISA 2 compiler 148-2, . . . , and the ISA N compiler 148-N). The data structure compatible file 146 may be a code file, representative of the program 115, written in a high-level programming language (e.g., C or C++) that generates and uses data structures that are compatible with the ISAs 1, 2, . . . , N (e.g., as discussed above with reference to the multi-architecture compatible data 126). Each of the compilers 148 may compile the data structure compatible file 146 in accordance with its associated ISA to generate an assembly code file 149 representative of the program 115. In some embodiments, each of the compilers 148 may perform a conversion operation at compile time to convert the endianness of the data structure compatible file 146 into the endianness appropriate for the corresponding ISA. Each assembly code file 149 may be provided to its associated assembler 150, and the assembler 150 may assemble the assembly code file 149 in accordance with its associated ISA to generate an object file 151 (in machine code) representative of the program 115. An object file 151 may include the program instructions and data, as well as debug data. The debug data may include information necessary for a debugger or exception handler to unwind (or "unroll") the program 115 back to the state of the machine registers and stack at any point higher up in the call stack, and may include information about the locations of handlers to control where the unwinding stops. In some embodiments, the debug data may include code in the DWARF format. The debug data in an object file 151 may provide the debug data 176, discussed below with reference to FIGS. 11-13. Not shown in FIG. 4 is a preprocessor, which may be included in some embodiments to expand macro definitions, include statements, or replace other shortcuts in the data structure compatible file 146 before reaching the compiler 148. The FIG. 4 also illustrates a multi-architecture linker 154. The multi-architecture linker 154 may be part of the multi-architecture toolchain 135. The multi-architecture linker 154 may access all of the object files 151 (as well as any relevant libraries 152, such as dynamic link libraries), and may link the binary representations 114 into the multi-architecture binary executable 116. As noted above, in some embodiments, the multi-architecture control logic 134 may not link the binary representations 114 into a multi-architecture binary executable 116, and thus may not include a multi-architecture linker 154. Instead, each of the object files 151 may be separately linked with libraries (and other support files, as appropriate) to generate separate binary representations 114 that are themselves binary executables. The output of the multi-architecture toolchain 135 (e.g., separately linked object files 151, or a multi-architecture binary executable 116) may be provided to and stored in the system memory 128, as discussed above. When the multi-architecture toolchain 135 is part of a computing system that is separate from the multi-architecture computing system 100, the output of the multi-architecture toolchain 135 may be transferred to the system memory 128 of the computing system 100 in any suitable manner (e.g., by computer readable media or network connections, as discussed above).

When multiple binary representations 114 for multiple different ISAs are included in a multi-architecture binary executable 116, the multi-architecture control logic 134 may include a dynamic loader to selectively load the appropriate binary representation 114 for a particular processor core 102. For example, FIG. 5 illustrates the loading of different binary representations 114 for execution from a multi-architecture binary executable 116, in accordance with various embodiments. FIG. 5 illustrates a dynamic loader 160 to load different binary representations 114 (each associated with a different one of the ISAs 1, 2, . . . , N) in a multi-architecture binary executable 116. The dynamic loader 160 may be part of the multi-architecture control logic 134. The dynamic loader 160 may access (e.g., read from the system memory 128) the multi-architecture binary executable 116, and load the appropriate binary representation 114 based on a control signal provided to the dynamic loader 160 (e.g., from the scheduling logic 194 of the multi-architecture control logic 134, discussed below). For example, the dynamic loader 160 may load the binary representation 114-1 for execution by the processor core 102-1, the dynamic loader 160 may load the binary representation 114-2 for execution by the processor core 102-2, etc.

During operation, the dynamic loader 160 may process the multi-architecture binary executable 116 once for each of the different ISAs represented therein to load the different binary representations 114. In some embodiments, the dynamic loader 160 may identify the desired binary representation 114 by comparing the ISA specified in the control signal to the ISA name included in an ELF section header; the dynamic loader 160 may load the binary representation 114 in the ELF section whose name matches an identifier of the ISA specified in the control signal. The dynamic loader 160 may also use relevant libraries 162 (such as dynamic link libraries), as known in the art. In embodiments of the multi-architecture computing system 100 in which no multi-architecture binary executable 116 is used, the dynamic loader 160 may separately recognize the appropriate binary representation 114 for an associated processor core 102. The dynamic loader 160 may read the binary representation 114, create an address space, initialize a register set, and execute a jump to the first instruction in the program 115.

FIG. 6 is a flow diagram of an illustrative method 210 of compiling and assembling a file in a multi-architecture computing system, in accordance with various embodiments. Although various operations of the method 210 may be illustrated with reference to various elements of a multi-architecture computing system 100, any suitable computing system may perform the method 210.

At 212, a file may be accessed (e.g., read). The file may have data structures compatible with multiple ISAs. For example, the data structure compatible file 146 may be accessed (e.g., from a memory, such as the system memory 128) by an ISA K compiler 148-K of a multi-architecture toolchain 135.

At 214, the file may be compiled in accordance with a first ISA to generate an assembly code file. For example, the ISA K compiler 148-K of the multi-architecture toolchain 135 may compile the data structure compatible file 146 to generate an assembly code file 149-K in accordance with the ISA K.

At 216, the assembly code file may be assembled in accordance with the first ISA to generate an object file. For example, the ISA K assembler 150-K of the multi-architecture toolchain 135 may assemble the assembly code file 149-K in accordance with the ISA K to generate the object file 151-K.

At 218, the object file may be accessed by a multi-architecture linker. For example, the object file 151-K (generated by the ISA K assembler 150-K) may be stored in a memory (e.g., the system memory 128) and accessed by the multi-architecture linker 154 of the multi-architecture toolchain 135. Note that, in some embodiments, the method 210 may be performed in series, in parallel, or in any suitable combination for multiple different ISAs; thus, the multi-architecture linker 154 may access object files assembled in accordance with multiple different ISAs.

FIG. 7 is a flow diagram of an illustrative method 220 of generating a multi-architecture binary executable, in accordance with various embodiments. Although various operations of the method 220 may be illustrated with reference to various elements of a multi-architecture computing system 100, any suitable computing system may perform the method 220. In some embodiments, the method 220 may be performed subsequent to the performance of the method 210.

At 222, multiple object files may be accessed. Each object file may be associated with a different ISA. For example, the multi-architecture linker 154 of a multi-architecture toolchain 135 may access object files 151 generated by each of multiple assemblers 150 (e.g., an object file 151-1 generated by the ISA 1 assembler 150-1, an object file 151-2 generated by the ISA 2 assembler 150-2, . . . , an object file 151-N generated by the ISA N assembler 150-N). These object files may be stored in a memory (e.g., the system memory 128). An object file associated with a particular ISA may be, or may be included in, the binary representation 114 associated with that particular ISA.

At 224, a multi-architecture binary executable may be generated. The multi-architecture binary executable may include the multiple object files. For example, the multi-architecture linker 154 of the multi-architecture toolchain 135 may generate the multi-architecture binary executable 116 using the multiple object files 151 (and, e.g., libraries 152 and any other associated support files).

FIG. 8 is a flow diagram of an illustrative method 230 of loading a binary representation from a multi-architecture binary executable, in accordance with various embodiments. Although various operations of the method 230 may be illustrated with reference to various elements of a multi-architecture computing system 100, any suitable computing system may perform the method 230. In some embodiments, the method 230 may be performed subsequent to the performance of the method 220.

At 232, a multi-architecture binary executable may be accessed. For example, a dynamic loader 160 of a multi-architecture control logic 134 may access a multi-architecture binary executable 116 stored in the system memory 128.

At 234, a binary representation may be loaded for a particular ISA represented in the multi-architecture binary executable. For example, the dynamic loader 160 of the multi-architecture control logic 134 may generate the binary representation 114-J from the multi-architecture binary executable 116 (e.g., in response to a control signal requesting loading of the binary representation 114-J or indicating that a processor core 102-J with the ISA J will run the program 115).

Figure 9:
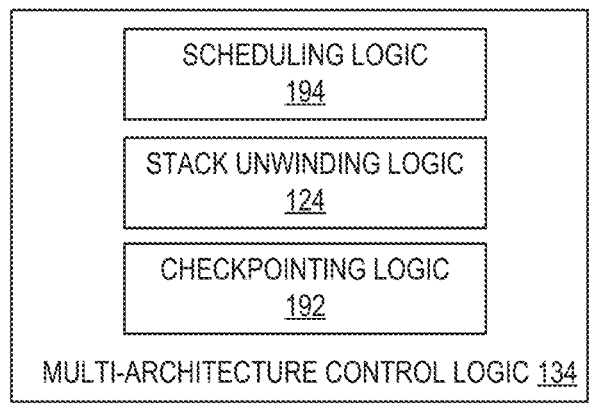
FIG. 9 is a block diagram of components that may be included in example multi-architecture control logic, in accordance with various embodiments.

A number of components are described herein as potentially being included in the multi-architecture control logic 134. FIG. 9 is a block diagram of some particular components that may be included in the multi-architecture control logic 134, in accordance with various embodiments. In the block diagram of FIG. 9, the multi-architecture control logic 134 is shown to include scheduling logic 194, stack unwinding logic 124, and checkpointing logic 192.

The scheduling logic 194 of the multi-architecture control logic 134 may control where a program 115 is executed among multiple processor cores 102. The scheduling logic 194 may be able to allocate work to the processor cores 102 at the process/thread level, and may do so based on assessment of the resource demand on the multi-architecture computing system 100. For example, the determination discussed above with reference to 206 of FIG. 3 may be performed by the scheduling logic 194. The scheduling logic 194 may implement any known techniques for selecting which of multiple processor cores 102 should handle execution of a program 115 (e.g., given demand and resource constraints, such as traffic volume); the systems and techniques disclosed herein provide ways of enabling the handoff of the program 115 among processor cores 102 having different architectures. In some embodiments, the scheduling logic 194 may be part of the OS of the multi-architecture computing system 100. In some embodiments, the scheduling logic 194 I may include policy logic that determines whether the program 115 should be moved, and moving logic that controls the transfer of the program 115 to a new processor core 102; each of these may take any suitable form.

The checkpointing logic 192 of the multi-architecture control logic 134 may control a checkpointing process used to record the state of a program 115 executing on a particular processor core 102-K so that the program 115 can be suspended on the processor core 102-K and resumed on another processor core 102-J. Conventional checkpointing is a method that improves fault tolerance of a program running on a processor by enabling the program to restore on that processor to a known good state, and infrastructure for controlling the checkpointing process may be included in an OS. For example, the Linux userspace checkpointing infrastructure may, among other things, capture and restore the kernel context of a program (e.g., the state of file handles, transmission control protocol (TCP) or other network connections, security contexts, etc.). The data captured during checkpointing (and used to restore a program) may be referred to herein as "checkpoint data."

As disclosed herein, checkpointing techniques may be modified to enable a program 115 to suspend on one processor core 102 and resume on another processor core 102 with a different ISA. In some embodiments (e.g., as discussed below with reference to FIG. 10), the checkpoint data may be stored in a format readable by multiple ISAs, and thus may be among the multi-architecture compatible data 126. In other embodiments, the checkpoint data may not be stored in a format readable by multiple ISAs; instead, the checkpoint data may be translated (e.g., by a data translation processing device, as discussed below with reference to FIGS. 14-17).

Figure 10:
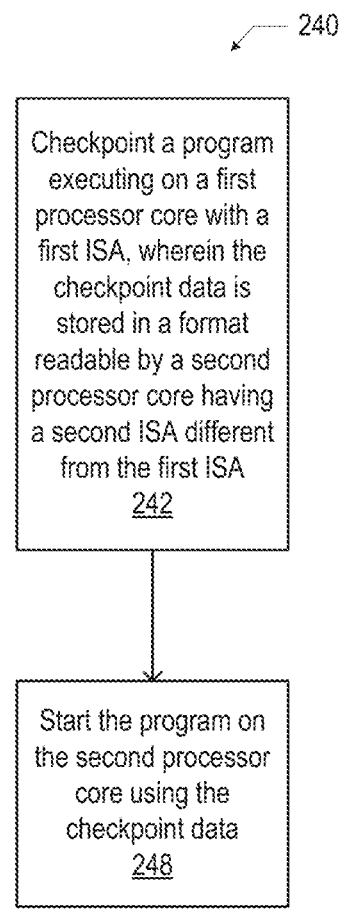
FIG. 10 is a flow diagram of a method of transferring execution of a program across processor cores having different ISAs using checkpointing, in accordance with various embodiments.

FIG. 10 is a flow diagram of a method 240 of transferring execution of a program across processor cores having different ISAs using checkpointing, in accordance with various embodiments. Although various operations of the method 240 may be illustrated with reference to various elements of a multi-architecture computing system 100, any suitable computing system may perform the method 240.

At 242, a program may be checkpointed while executing on a first processor core having a first ISA. In the method 240, checkpointing the program may include storing checkpoint data for the program in a format readable by a second processor core having a second ISA different from the first ISA. For example, the program 115 may be executing on the processor core 102-J (e.g., via the binary representation 114-J) when the checkpointing logic 192 causes a checkpoint to be stored as multi-architecture compatible data 126. The checkpoint data may include a snapshot of the state of operation of the program 115, and may be generated in accordance with any existing checkpointing technique (e.g., any technique performed by a program and/or an OS, or otherwise performed in any combination of the userspace and kernel). The checkpoint data may include data representative of the state of the program 115 to allow the program 115 to be restored as a fully functioning exact copy. The checkpoint may be triggered by the OS, by the program itself, or both, for example.

At 244, the program may be executed by the second processor core using the checkpoint data. For example, the checkpointing logic 192 may cause the program 115 to be resumed by a processor core 102-K (e.g., by executing the binary representation 114-K) starting from the checkpoint represented by the checkpoint data.

In some embodiments, the program 115 may signal to the checkpointing logic 192 when it is executing a return path from a system call (e.g., a call into the kernel code), and in response, the checkpointing logic 192 may generate a full or partial checkpoint. This may result in the creation of a checkpoint when the program context may change, and thus may improve the performance of the checkpoint-and-restore systems and techniques disclosed herein. In some embodiments, the checkpointing logic 192 (e.g., part of the OS or provided by an add-on library) may use system calls as hooks for where the state of the program 115 may be readily captured.

Figure 11:
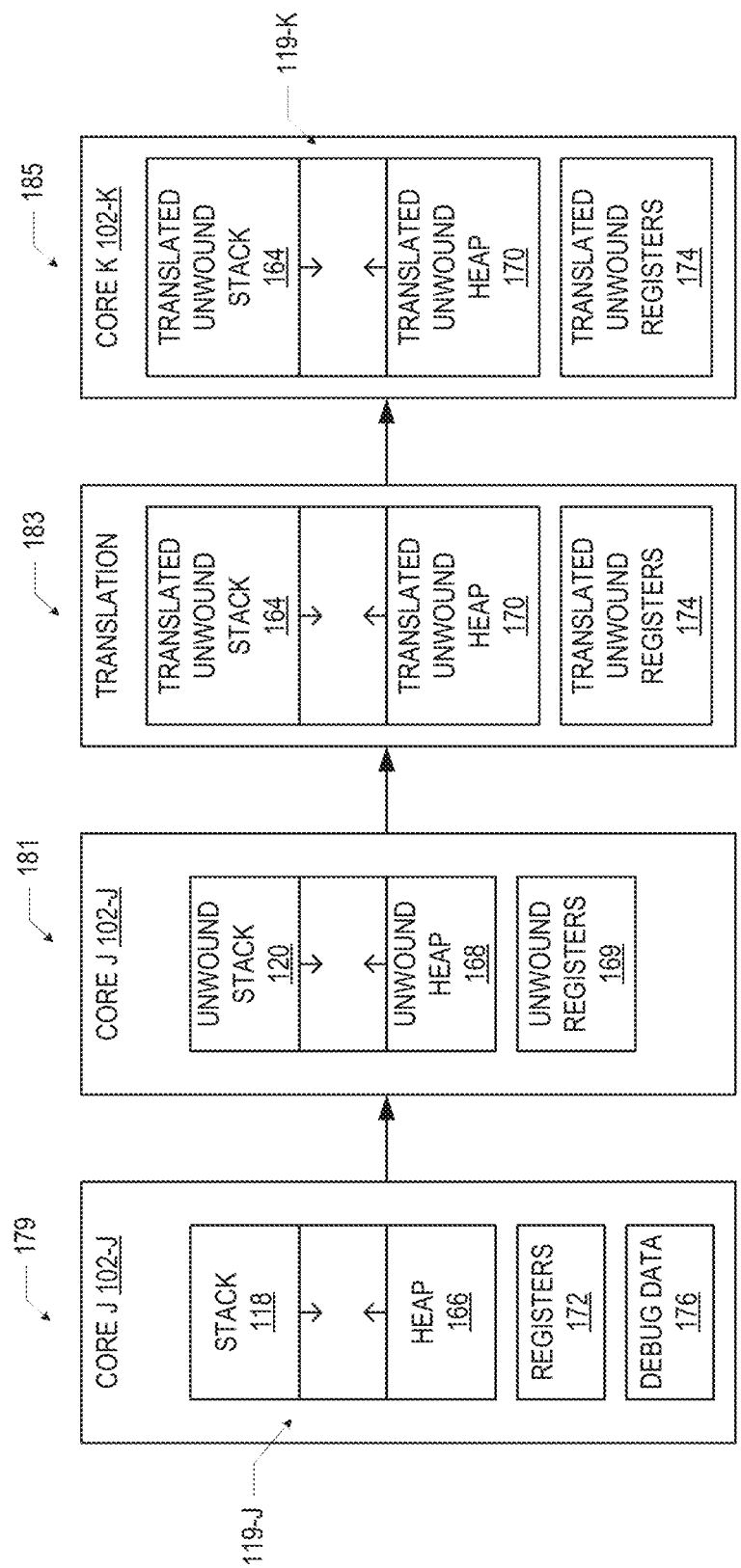
FIG. 11 illustrates transferring a program across processor cores having different ISAs using stack unwinding, in accordance with various embodiments

Returning to FIG. 9, as noted above, the multi-architecture control logic 134 may include stack unwinding logic 124. The stack unwinding logic 124 may control a stack unwinding process used to hold the program 115 executing on a particular processor core 102-K and resume that program 115 on another processor core 102-J. FIG. 11 illustrates transferring a program across processor cores having different ISAs using stack unwinding, in accordance with various embodiments. The operations discussed below with reference to FIG. 11 may be controlled by the stack unwinding logic 124, as described.

In particular, FIG. 11 illustrates various phases in the transfer of execution of a program 115 from a processor core 102-J to a processor core 102-K. In phase 179, the multi-architecture control logic 134 (e.g., the stack unwinding logic 124) may suspend operation of the program 115 on the processor core 102-J (e.g., by suspending execution of the binary representation 114-J). The processor core 102-J may maintain a program stack 119-J for the program 115 including stack data 118 and heap data 166 (stored, e.g., in the system memory 128). The processor core 102-J may also store register data 172 related to the program 115 (e.g., in the registers 106-J).

Additionally, debug data 176 associated with the operation of the program 115 on the processor core 102-J may be stored in the system memory 128. As discussed above, the debug data 176 may be created by a compiler 148 of the multi-architecture toolchain 135. The debug data 176 may include information that may be used by a debugger or an exception handler to roll the state of the program 115 back to a previous state in the execution history of the program 115 (e.g., the last function call). The debug data 176 may include, for example, information related to which shortcuts were performed during execution of the program 115. Examples of the debug data 176 may include any of the debug data discussed above with reference to the object files 151.

In phase 181, the multi-architecture control logic 134 (e.g., the stack unwinding logic 124) may cause the program stack 119-J to unwind to a previous function call. The unwinding of the program stack 119-J may be performed using any techniques conventionally used in debuggers and exception handlers to return the stack to the previous state (e.g., the last function call). In some embodiments, the stack unwinding logic 124 may use the debug data 176 to perform the unwinding (e.g., as used by debuggers and exception handlers). After unwinding, the program stack 119-J may include unwound stack data 120, unwound heap data 168, and unwound register data 169.

In phase 183, the multi-architecture control logic 134 (e.g., the stack unwinding logic 124) may translate the data in the unwound program stack 119-J into a format readable by the processor core 102-K (e.g., readable by the ISA K). In particular, the unwound stack data 120 may be translated into translated unwound stack data 164, the unwound heap data 168 may be translated into the translated unwound heap data 170, and the translated unwound stack data 164 and the translated unwound heap data 170 may be stored in the system memory 128. The multi-architecture control logic 134 (e.g., the stack unwinding logic 124) may also translate the unwound register data 169 (in the registers 106-J) into translated unwound register data 174. The translated unwound register data 174 may be stored in the system memory 128, and may be readable by the processor core 102-K (e.g., readable by the ISA K). As discussed above, the translation may include any operations to make the translated data compatible with the ISA K (e.g., a change in endianness, a change in the word size, a change in the address space, a change in the number of operands, etc.).

In phase 185, the multi-architecture control logic 134 (e.g., the scheduling logic 194) may cause the processor core 102-K to commence operation of the program 115 (e.g., by execution of the binary representation 114-K) starting with a program stack 119-K including the translated unwound stack data 164 and the translated unwound heap data 170. The registers 106-K associated with the processor core 102-K may be populated with the translated unwound register data 174 prior to commencing execution of the program 115. In this manner, the processor core 102-K may resume operation of the program 115 where such operation left off on the processor core 102-J.

Figures 12, 13:
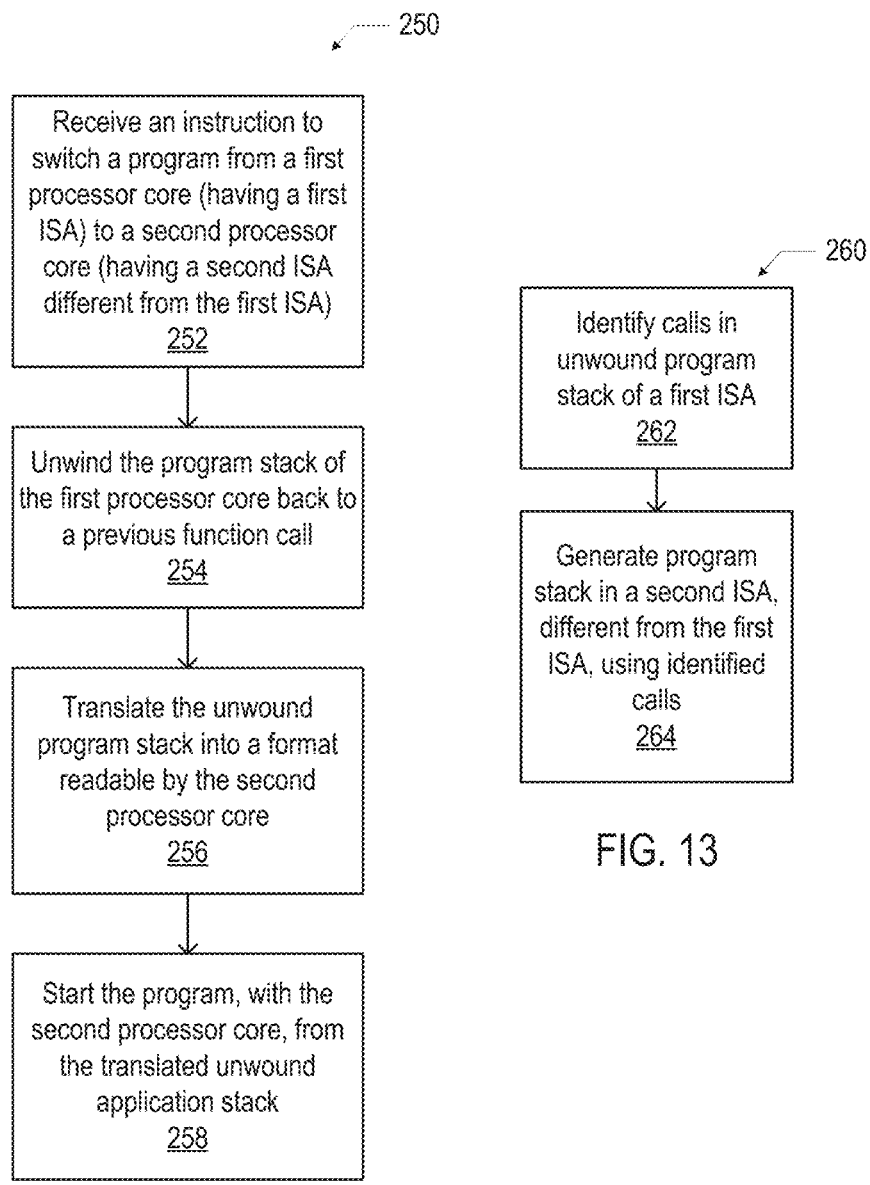
FIG. 12 is a flow diagram of an illustrative method of transferring execution of a program across processor cores having different ISAs using stack unwinding, in accordance with various embodiments.
FIG. 13 is a flow diagram of an illustrative method of translating a program stack from one ISA to another ISA, in accordance with various embodiments.

FIG. 12 is a flow diagram of an illustrative method 250 of transferring execution of a program across processor cores having different ISAs using stack unwinding, in accordance with various embodiments. Although various operations of the method 250 may be illustrated with reference to various elements of a multi-architecture computing system 100, any suitable computing system may perform the method 250.

At 252, an instruction may be received to switch execution of a program from a first processor core (with a first ISA) to a second processor core (with a second ISA different from the first ISA). For example, the scheduling logic 194 may issue an instruction to the stack unwinding logic 124 to cause the processor core 102-J to suspend execution of a program 115 so that execution of the program 115 may be transferred to the processor core 102-K. A program stack 119-J may include stack data 118 and heap data 166. In some embodiments, the instruction received at 252 may not indicate which processor core will resume operation of the program, only that operation of the program on the current processor core should suspend.

At 254, the program stack of the first processor core may be unwound back to a previous function call. For example, the stack unwinding logic 124 may cause the program stack 119-J associated with execution of the program 115 on the processor core 102-J may be unwound (i.e., the data included in the program stack 119-J may be changed) to represent the state of the program stack 119-J at the time of a previous function call (e.g., the most recent function call). The unwound program stack data may include unwound stack data 120 and unwound heap data 168, for example.

At 256, the unwound program stack of the first processor core may be translated into a format readable by the second processor core. For example, the scheduling logic 194 may indicate the ISA of the processor core 102 that will be resuming operation of the program 115, and the stack unwinding logic 124 may translate the data of the program stack 119-J into data that may populate a program stack 119-K for use by the processor core 102-K. The translated unwound program stack data may include translated unwound stack data 164 and translated unwound heap data 170, for example. In some embodiments, at 256, unwound data from the registers of the first processor core may be translated into data appropriate for registers of the second processor core (e.g., as discussed above with reference to the unwound register data 169 and the translated unwound register data 174 of FIG. 11). Translation may include any operations to make the translated data compatible with the ISA K (e.g., a change in endianness, a change in the word size, a change in the address space, a change in the number of operands, etc.).

At 258, the second processor core may resume execution of the program using the translated unwound program stack. For example, the processor core 102-K may populate a program stack with the translated unwound stack data 164 and the translated unwound heap data 170. The processor core 102-K may also populate its registers 106-K with the translated unwound register data 174.

FIG. 13 is a flow diagram of an illustrative method 260 of translating a program stack from one ISA to another ISA, in accordance with various embodiments. Although various operations of the method 260 may be illustrated with reference to various elements of a multi-architecture computing system 100, any suitable computing system may perform the method 260. In some embodiments, the method 260 may be performed as part of the operations discussed above with reference to 256 of the method 250.

At 262, calls may be identified in an unwound program stack of a processor core having a first ISA. For example, the multi-architecture control logic 134 (e.g., the stack unwinding logic 124) may analyze the data in the unwound program stack 119-J (illustrated as part of phase 181 in FIG. 11) to identify the calls that made up the unwound program stack 119-J during execution of the program 115 by the processor core 102-J.

At 264, a program stack for a second processor core having a second ISA, different from the first ISA, may be generated using the identified calls. For example, the multi-architecture control logic 134 (e.g., the stack unwinding logic 124) may generate a program stack compatible with the second ISA by substituting each call identified at 262 with an equivalent call compatible with the second ISA.

In some embodiments, the multi-architecture control logic 134 may include both the checkpointing logic 192 and the stack unwinding logic 124, and may use both in any suitable combination to transfer execution of a program 115 from one processor core 102 to another. In such embodiments, the multi-architecture control logic 134 may perform the operations discussed above with reference to FIG. 10, as well as the operations discussed above with reference to FIGS. 11-13. For example, if execution of a program 115 on a processor core 102-J was stopped in order to move execution of that program 115 to a processor core 102-K, and no system calls had been performed since the last checkpoint (so that the kernel context had not changed since the last checkpoint), the stack unwinding techniques disclosed herein may be used to unwind to the previous state and resume the program 115 on the processor core 102-K, as described above.

In other embodiments, the multi-architecture control logic 134 may include the checkpointing logic 192 (but not the stack unwinding logic 124) or the stack unwinding logic 124 (but not the checkpointing logic 192). For example, in such embodiments, the multi-architecture control logic 134 may perform the operations discussed above with reference to FIG. 10, or the operations discussed above with reference to FIGS. 11-13, but not both. The checkpointing techniques disclosed herein may include logic in the program 115 to communicate to the checkpointing infrastructure (e.g., in the OS) when a safe point has been reached in the processing (e.g., a point to which the program 115 may be safely rolled back); the stack unwinding techniques disclosed herein may not require such logic. Additionally, the checkpointing techniques disclosed herein incur the processing cost of generating the checkpoint data each time the program 115 is checkpointed, thus reducing overall throughput; the stack unwinding techniques disclosed herein may not incur such costs.

Figure 14:
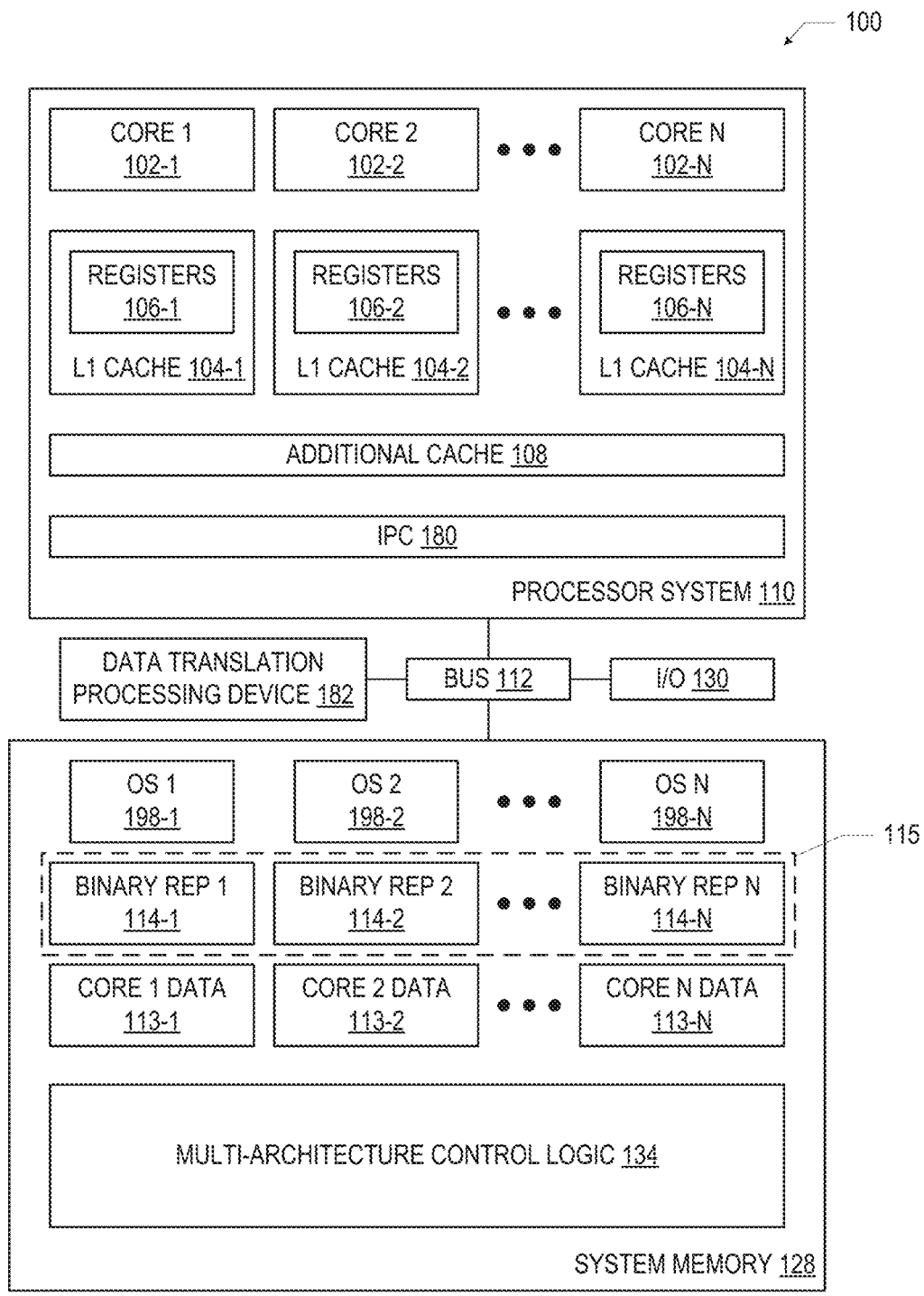
FIG. 14 is a block diagram of a multi-architecture computing system, in accordance with various embodiments.

In various embodiments discussed above, a multi-architecture computing system 100 may include multi-architecture compatible data 126 that may be used by binary representations 114 on processor cores 102 having different ISAs, thus enabling handover of the program 115 associated with the binary representations 114 between these different processor cores 102. In some embodiments, a multi-architecture computing system 100 may not include multi-architecture compatible data 126, and instead, may include a data translation processing device that may perform any necessary data structure translations as control of a program 115 is transferred between processor cores 102 having different ISAs. FIG. 14 is a block diagram of such a multi-architecture computing system 100, in accordance with various embodiments.

A number of the elements of the multi-architecture computing system 100 illustrated in FIG. 14 are shared with the multi-architecture computing system 100 of FIG. 1A (and may take the form of any of the embodiments of those elements discussed herein, such as those discussed with reference to FIGS. 1B and 1C). However, the multi-architecture computing system 100 illustrated in FIG. 14 also includes a data translation processing device 182 coupled to the bus 112. During operation of the multi-architecture computing system 100 of FIG. 14, the translation of data structures between different ISAs of different processor cores 102 may be performed by the data translation processing device 182. For example, data generated and used by the processor core 102-1 (represented in FIG. 14 as core 1 data 113-1) may be translated, by the data translation processing device 182, into data readable by the processor core 102-2 (represented in FIG. 14 as core 2 data 113-2) so that a program 115 operating on the processor core 102-1 may be handed over to the processor core 102-2. In some embodiments, for example, the data translation processing device 182 may perform address space translations, including offset calculations and layout translations to generate a multi-architecture compatible address space representation. As noted above, translation may include any operations to make the translated data compatible with the target processor core 102 (e.g., a change in endianness, a change in the word size, a change in the address space, a change in the number of operands, etc.).

FIG. 14 also illustrates an embodiment in which different OSs 198 control operations on different cores 102 (e.g., the OS 198-1 is associated with the processor core 102-1, the OS 198-2 is associated with the processor core 102-2, etc.). Different binary representations 114 may be associated with different processor cores 102, as discussed above with reference to FIG. 1. The different binary representations 114 illustrated in the system memory 128 of FIG. 14 may still represent a common program 115, but handing off operation of the program 115 between processor cores 102 may include signaling the handoff between the OSs 198 associated with the different processor cores 102. The signaling between the OSs 198 may be controlled by an interprocess communication (IPC) mechanism 180. The IPC mechanism 180 may take the form of any known IPC mechanism, and may include, for example, in-memory task queues, in-memory message queues, and/or inter-processor interrupts. Multi-architecture control logic 134 may control the execution of the program 115 on different processor cores 102 in any of the ways discussed above, and the data translation processing device 182 may handle any necessary data translation.

The data translation processing device 182 may be a processing device separate from any of the processor cores 102. For example, the data translation processing device 182 may be a field programmable gate array (FPGA), an ASIC, or other suitable processing device. The data translation processing device 182 may be mounted on a common circuit board (e.g., a motherboard) with the processor cores 102 of the multi-architecture computing system 100.

FIG. 15 is a flow diagram of an illustrative method 270 of switching operation of a program from a processor core with one ISA to a processor core with a different ISA, in accordance with various embodiments. Although various operations of the method 270 may be illustrated with reference to various elements of a multi-architecture computing system 100, any suitable computing system may perform the method 270.

At 272, an instruction may be received to switch a program from a first processor core (with a first ISA and running a first OS) to a second processor core (with a second ISA and running a second OS, different from the first ISA and the first OS, respectively). For example, the multi-architecture control logic 134 (e.g., the scheduling logic 194) may issue an instruction to cause the processor core 102-J to suspend execution of a program 115 so that execution of the program 115 may be transferred to the processor core 102-K. In some embodiments, the instruction received at 272 may not indicate which processor core will resume operation of the program, only that operation of the program on the current processor core should suspend.

At 274, program data from the operation of the program on the first processor core may be provided for access by a data translation processing device. For example, when a stack unwinding technique is used, program stack data (e.g., as discussed above with reference to the program stacks 119), register data (e.g., as discussed above with reference to the register data 172), and debug data (e.g., as discussed above with reference to the debug data 176) generated during operation of the program 115 on the processor core 102-K may be stored in the system memory 128, where it may be accessed by the data translation processing device 182. This program data may be stored as the core J data 113-J. In another example, when a checkpointing technique is used, checkpoint data (e.g., as discussed above with reference to the checkpointing logic 192 and method 240) may provide the program data; at 274, the checkpoint data generated during checkpointing of a program 115 on the processor core 102-K may be stored in the system memory 128, where it may be accessed by the data translation processing device 182 and then stored as the core J data 113-J.

FIG. 16 is a flow diagram of an illustrative method 280 of translating data structures compatible with one ISA into data structures compatible with another ISA in a multi-architecture computing system, in accordance with various embodiments. Although various operations of the method 280 may be illustrated with reference to various elements of a multi-architecture computing system 100, any suitable computing system may perform the method 280. In some embodiments, the method 280 may be performed subsequent to the method 270.

At 282, program data may be accessed from a memory. The program data may represent the operation of the program on a first processor core. The first processor core may have a first ISA and may be running a first OS. For example, the data translation processing device 182 may access program stack data (e.g., as discussed above with reference to the program stacks 119), register data (e.g., as discussed above with reference to the register data 172), and debug data (e.g., as discussed above with reference to the debug data 176) stored in the system memory 128 (e.g., as the core J data 113-J) after operation of a program 115 on a first processor core 102-J.

At 284, data structures in the program data may be translated from the format of the first ISA to the format of a second ISA, different from the first ISA. For example, the data translation processing device 182 may translate data structures in any of the program data discussed above (e.g., with reference to 282) to a format compatible with an ISA of a different processor core 102 (e.g., an ISA K of a processor core 102-K). The translation may include any operations to make the translated data structures compatible with the second ISA (e.g., a change in endianness, a change in the word size, a change in the address space, a change in the number of operands, etc.).

At 286, the data translation processing device may store the translated data structures in the memory. For example, subsequent to translation of data structures, the data translation processing device 182 may store the translated data in the system memory 128 (e.g., core J data 113-J may be translated into and stored as core K data 113-K).

FIG. 17 is a flow diagram of an illustrative method 290 of signaling a switch in the execution of a program from one processor core to another processor core using a different OS, in accordance with various embodiments. Although various operations of the method 290 may be illustrated with reference to various elements of a multi-architecture computing system 100, any suitable computing system may perform the method 290.

At 292, an instruction may be received to switch a program from a first processor core (with a first ISA and running a first OS) to a second processor core (with a second ISA and running a second OS, different from the first ISA and the first OS, respectively). For example, the multi-architecture control logic 134 (e.g., the scheduling logic 194) may issue an instruction to the OS 198-J to cause the processor core 102-J to suspend execution of a program 115 so that execution of the program 115 may be transferred to the processor core 102-K.

At 294, an IPC switch message may be provided to the second OS. The IPC switch message may indicate to the second OS that a second processor core associated with the second OS is to take over handling of the execution of the program (e.g., a virtual machine (VM), an application, or a container). For example, the IPC mechanism 180 may be used to communicate between the OS J 198-J and the OS K 198-K to signal the transfer of control of the program 115 from the processor core 102-J to the processor core 102-K.

In some embodiments of the multi-architecture computing system 100 of FIG. 14, the system memory may not include N different binary representations 114, but may instead include a single binary representation of the program 115, and the data translation processing device 182 may translate each of the instructions for execution by the designated processor core 102 (and the associated ISA).

In some embodiments of the multi-architecture computing system 100 of FIG. 14, the data translation processing device 182 may include tables or other data structures for translating the address spaces expected by different ISAs. For example, if one ISA has a bifurcated address space (e.g., one in which the kernel space and the user space are kept separate, or bifurcated in some other manner), and another ISA does not have such a bifurcated address space, the data translation processing device 182 may translate addresses compatible with one ISA into addresses compatible with the other ISA.

FIGS. 18 and 19 are flow diagrams of illustrative methods 300 and 310, respectively, of combining computing resources to form a multi-architecture computing system 100, in accordance with various embodiments. Such techniques may be used to form a computing system 100 like the computing system 100 illustrated in FIG. 1B, for example. However, such techniques are not limited to being used when a single-architecture computing system 100A communicates with a one-or-more-architecture computing system 100B to form a multi-architecture computing system 100, but may also be used when a one-or-more-architecture computing system 100B communicates with another one-or-more-architecture computing system 100B to form a multi-architecture computing system 100. In some embodiments, when two computing systems combine computing resources to form a multi-architecture computing system 100, one of the computing systems may perform the method 300 and the other computing system may perform the method 310. Although various operations of the methods 300 and 310 may be illustrated with reference to various elements of a multi-architecture computing system 100, any suitable computing system may perform the methods 300 and 310.

Turning to the method 300 of FIG. 18, at 302, a first computing system may communicatively connect with a second computing system. The first computing system may include at least one first processor core with a first ISA and the second computing system may include at least one second processor core with a second ISA different from the first ISA. For example, a computing system 100A (FIG. 1B) may include at least one processor core 102 having a first ISA and a computing system 100B may include at least one processor core 102 having at least one second ISA different from the first ISA. The first and second computing systems may communicatively connect in any suitable manner, such as using a bus 112 or a communication link 117.

At 304, the first computing system may initialize hardware of the second computing system. For example, the computing system 100A may initialize hardware of the computing system 100B. In some embodiments, initializing hardware of the second computing system may include hot plugging the processor cores of the second computing system so that the first computing system regards the processor cores 102 of the second computing system as its own without having to power down. From a software perspective, hot plugging may add hardware to an OS that supports that hardware; from a hardware perspective, hot plugging may add hardware (e.g., one or more processor cores 102) and utilize that hardware in a "live" computing system. In some embodiments, initializing hardware of the second computing system may include hot plugging one or more memory devices of the second computing system so that the first computing system regards the processor cores of the second computing system as its own without having to power down. In some embodiments, memory devices may be hot plugged before processor cores are hot plugged, and processor cores may be hot plugged before peripherals are hot plugged. I/O devices and/or interfaces 130 of the second computing system, such as any peripheral devices, may also be hot plugged into the first computing system. The order in which different hardware elements of the second computing system are initialized (e.g., the order in which they are hot plugged) may depend on topology; if a memory controller is part of a CPU, for example, the CPU may need to be initialized before the memory may be accessed. In another example, if a PCIe root complex is part of a CPU, it may be enabled first (and disabled last). In some embodiments, the second computing system may initialize hardware of the first computing system at 304.

At 306, the first computing system may cause execution of a program to switch from the at least one first processor core to the at least one second processor core. For example, the computing system 100A may suspend execution of a program 115 and may provide an instruction to the computing system 100B via the communication link 117 (or via a bus 112) for a processor core 102 of the computing system 100B to resume execution of the program 115. The suspending, transferring, and resuming of execution of the program in the method 300 may take the form of any of the embodiments disclosed herein (e.g., those discussed above with reference to FIG. 3 and FIGS. 9-17). In some embodiments, the first computing system may initiate the switch at 306, or the second computing system may initiate the switch at 306; in the latter case, the first computing system may cause execution of the program to switch by agreeing to and supporting the switch (e.g., by providing data to be used by the second processor core during execution of the program). In some embodiments, the second computing system may switch execution of a program from the at least one second processor core to the at least one first processor core at 306. The switching of the processor core that executes the program at 306 may be determined by the multi-architecture control logic 134 in accordance with any of the techniques disclosed herein. In some embodiments, the kernel 132 (including the multi-architecture control logic 134) may run on the processor cores of the second computing system at 306.

Turning to the method 310 of FIG. 19, at 312, a first computing system may communicatively connect with a second computing system. The first computing system may include at least one first processor core with a first ISA and the second computing system may include at least one second processor core with a second ISA different from the first ISA. In some embodiments, the operations performed at 312 may take the form of any of the operations discussed above with reference to 302 of FIG. 18. For example, a computing system 100A (FIG. 1B) may include at least one processor core 102 having a first ISA and a computing system 100B may include at least one processor core 102 having at least one second ISA different from the first ISA. The first and second computing systems may communicatively connect in any suitable manner, such as using a bus 112 or a communication link 117.

At 314, the second computing system may load a binary representation of a program for the second ISA. The program may be a program that was previously executed by the at least one first processor core. For example, the computing system 100B (FIG. 1B) may load a binary representation 114 of a program 115 for the ISA associated with a processor core 102 of the computing system 100B. The program 115 may have been previously executed by a processor core 102 of the computing system 100A. In some embodiments, the kernel 132 (including the multi-architecture control logic 134) may run on the processor cores of the second computing system at 314.

At 316, the at least one second processor core may resume execution of the program. The transferring of execution of the program in the method 310 may take the form of any of the embodiments disclosed herein (e.g., those discussed above with reference to FIG. 3 and FIGS. 9-17). The first computing system may initiate the switch at 316, or the second computing system initiate the switch at 316; in the latter case, the first computing system may agree to and support the switch (e.g., by providing data to be used by the second processor core during execution of the program). In some embodiments, the program 115 may represent particular high priority tasks that are to be moved from a lower-computing capacity first computing system (e.g., a mobile computing device) to a higher-computing capacity second computing system (e.g., a docking station) for improved performance.

FIGS. 20 and 21 are flow diagrams of illustrative methods 320 and 330, respectively, of removing computing resources from a multi-architecture computing system, in accordance with various embodiments. Such techniques may be used to decouple components of a computing system 100 like the computing system 100 illustrated in FIG. 1B, for example. However, such techniques are not limited to being used when a single-architecture computing system 100A is decoupled from a one-or-more-architecture computing system 100B, but may also be used when a one-or-more-architecture computing system 100B is decoupled from another one-or-more-architecture computing system 100B. In some embodiments, when resources are removed from a multi-architecture computing system 100 to form two separate computing systems, one of the computing systems may perform the method 320 and the other computing system may perform the method 330. Although various operations of the methods 320 and 330 may be illustrated with reference to various elements of a multi-architecture computing system 100, any suitable computing system may perform the methods 320 and 330.

Turning to the method 320 of FIG. 20, at 322, a first computing system may receive an instruction to execute, with at least one first processor core of the first computing system, a program previously executed by at least one second processor core of a second computing system. The at least one first processor core may have a first ISA different from a second ISA of the at least one second processor core. For example, the computing system 100A (FIG. 1B) may receive an instruction from the computing system 100B to execute a program 115 with a processor core 102 of the computing system 100A. The program 115 may have been previously executed by a processor core 102 of the computing system 100B. The instruction may be provided to the first computing system by the second computing system or another computing system (e.g., via a communications link 117). The timing and content of the instruction of 322 may be determined by the multi-architecture control logic 134 in accordance with any of the techniques disclosed herein.

At 324, the first computing system may load a binary representation of the program for the first ISA. For example, the computing system 100A (FIG. 1B) may load a binary representation 114 of the program 115; the binary representation 114 may be compatible with the ISA of the processor core 102 of the computing system 100A.

At 326, the first computing system may resume execution of the program on the at least one first processor core using data provided by the second computing system. For example, the computing system 100A may execute the program 115 (using the associated binary representation 114) using multi-architecture compatible data 126 provided by the computing system 100B. In some embodiments, the data may be provided to the first computing system along with the instruction to execute the program (as discussed above with reference to 322), or the first computing system may separately access the data. In some embodiments, the second computing system may move its memory content associated with the program to a memory device of the first computing system. In some embodiments, the OS of the first computing system may store memory pages for implementing virtual memory in a swap device (e.g., for Linux) or a page file (e.g., for Windows). If a program 115 attempts to use an address in the "old" address range, the OS may trap the access and bring the page into a main memory (as may be done for a regular virtual page that's swapped out). Using such a technique may be useful for migrating pages from memory that may become unavailable. The suspending, transferring, and resuming of execution of the program in the method 320 may take the form of any of the embodiments disclosed herein (e.g., those discussed above with reference to FIG. 3 and FIGS. 9-17).

At 328, the first computing system and the second computing system may communicatively disconnect. For example, the communication link 117 between the computing system 100A (FIG. 1B) and the computing system 100B may be broken or terminated or made dormant by either of the computing systems 100A and 100B (e.g., via a user of the computing system 100A or the computing system 100B) or by an outside factor (e.g., any of those disclosed herein). In some embodiments, disconnecting the first and second computing systems at 328 may include hot unplugging peripheral devices, hot unplugging processor cores, hot unplugging memory devices, and/or physically disconnecting the first and second computing systems.

Turning to the method 330 of FIG. 21, at 332, a second computing system may receive an instruction to switch execution of a program from at least one second processor core of the second computing system to at least one first processor core of a first computing system. The at least one first processor core may have a first ISA different from a second ISA of the at least one second processor core. The timing and content of the instruction of 332 may be determined by the multi-architecture control logic 134 in accordance with any of the techniques disclosed herein. In response to the instruction, the second computing system may suspend execution of the program. For example, a computing system 100B (FIG. 1B) may receive an instruction (generated internally or externally) to stop execution of a program 115 on a processor core 102 of the computing system 100B so that a processor core of the computing system 100A can pick up execution of the program 115.

At 334, the second computing system may provide data to the first computing system for use in resuming execution of the program on the at least one first processor core. For example, the computing system 100B may provide multi-architecture compatible data 126 to the computing system 100A, and a processor core 102 of the competing system 100A may use this data when executing the program 115. In some embodiments, the second computing system may provide the data to the first computing system by storing the data in a memory device accessible by the first computing system. In some embodiments, the second computing system may provide the data to the first computing system by actively transmitting the data to the first computing system over the communication link 117. The suspending, transferring, and resuming of execution of the program in the method 330 may take the form of any of the embodiments disclosed herein (e.g., those discussed above with reference to FIG. 3 and FIGS. 9-17).

At 336, the first computing system and the second computing system may communicatively disconnect. The operations performed at 336 may take the form of any of the operations discussed above with reference to 328 (FIG. 20).

Figures 22, 23:
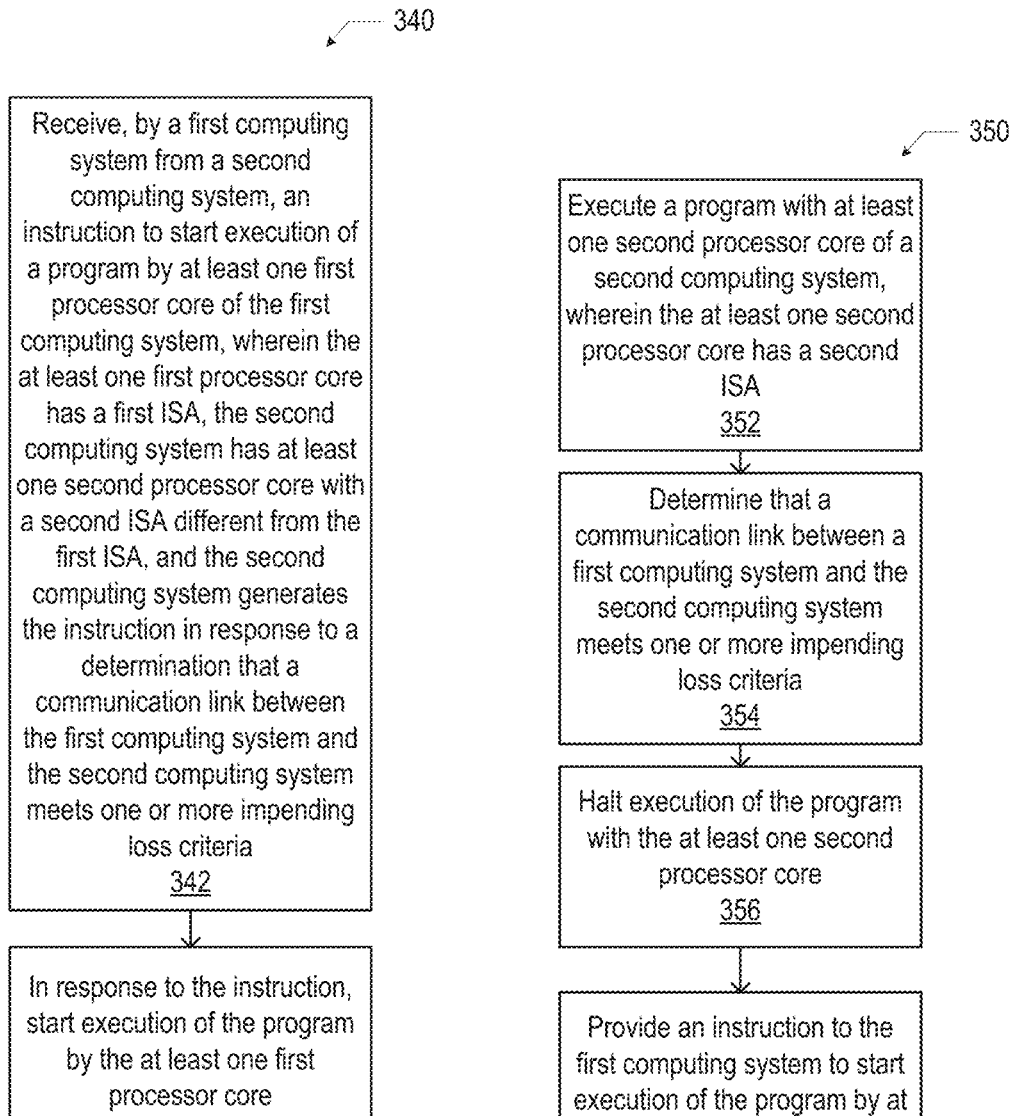
FIGS. 22-23 are flow diagrams of illustrative methods of transferring execution of a program between processor cores, in accordance with various embodiments.

FIGS. 22 and 23 are flow diagrams of illustrative methods 340 and 350, respectively, of transferring execution of a program between processor cores, in accordance with various embodiments. In particular, the methods 340 and 350 may be performed in order to transfer execution of a program between computing systems when communication between the computing systems is expected to be lost (e.g., as discussed above with reference to FIG. 1). Such techniques may be used to transfer execution in a computing system 100 like the computing system 100 illustrated in FIG. 1B, for example. However, such techniques are not limited to being used when execution of a program is to be transferred between a single-architecture computing system 100A and a one-or-more-architecture computing system 100B, but may also be used when execution of a program is transferred between a one-or-more-architecture computing system 1006 and another one-or-more-architecture computing system 100B. In some embodiments, when execution of a program is transferred between two subsystems of a computing system under the expectation that connectivity between the subsystems may be lost, one of the subsystems may perform the method 340 and the other subsystem may perform the method 350. Although various operations of the methods 340 and 350 may be illustrated with reference to various elements of a multi-architecture computing system 100, any suitable computing system may perform the methods 340 and 350.

Turning to the method 340 of FIG. 22, at 342, a first computing system may receive, from a second computing system, an instruction to take over execution of a program with at least one first processor core of the first computing system. The at least one first processor core may have a first ISA, and the second computing system may have at least one second processor core with a second ISA different from the first ISA. The second computing system may generate the instruction in response to a determination that a communication link between the first computing system and the second computing system meets one or more impending loss criteria. The determination that the communication link meets one or more impending loss criteria may be made by the first computing system, the second computing system, by another computing system, or by any combination of computing systems. In some embodiments, the second processor core may have been previously executing the program before the instruction is sent. Any suitable determination technique may be used to assess whether the communication link meets one or more impending loss criteria (e.g., any of the techniques discussed above, such as those related to offline modes, geofence boundaries, battery level, etc.). For example, the computing system 100A (FIG. 1B) may receive an instruction to take over execution of a program 115 from the computing system 100B in response to a determination that the communication link 117 between the computing systems 100A and 100B meets one or more impending loss criteria. The timing and content of the instruction of 342 may be determined by the multi-architecture control logic 134 in accordance with any of the techniques disclosed herein.

At 344, the at least one first processor core may start execution of the program in response to the instruction. For example, a processor core 102 of the computing system 100A may begin execution of the program 115 (using a suitable associated binary 114) in response to the instruction from the computing system 100B. The suspending, transferring, and starting of execution of the program in the method 340 may take the form of any of the embodiments disclosed herein (e.g., those discussed above with reference to FIG. 3 and FIGS. 9-17).

Turning to the method 350 of FIG. 23, at 352, at least one second processor core of a second computing system may execute a program. The at least one second processor core may have a second ISA. For example, a processor core 102 of the computing system 100B (FIG. 1B) may execute a program 115 (using a binary representation 114 compatible with the first ISA).

At 354, a determination may be made that a communication link between a first computing system and the second computing system meets one or more impending loss criteria. The determination may be made in accordance with any of the techniques disclosed herein, such as any of the techniques discussed above with reference to 342 of FIG. 22.

At 356, the at least one second processor core may suspend execution of the program. For example, a processor core 102 of the computing system 100B may suspend execution of the program 115.

At 358, the second computing system may provide an instruction to the first computing system to resume execution of the program by at least one first processor core of the first computing system. The at least one first processor core may have a first ISA different from the second ISA. For example, the computing system 100B (FIG. 1B) may provide an instruction to the computing system 100A to resume execution of the program 115 by a processor core 102 of the computing system 100A. The suspending, transferring, and resuming of execution of the program in the method 350 may take the form of any of the embodiments disclosed herein (e.g., those discussed above with reference to FIG. 3 and FIGS. 9-17). The timing and content of the instruction of 358 may be determined by the multi-architecture control logic 134 in accordance with any of the techniques disclosed herein.

Figure 24:
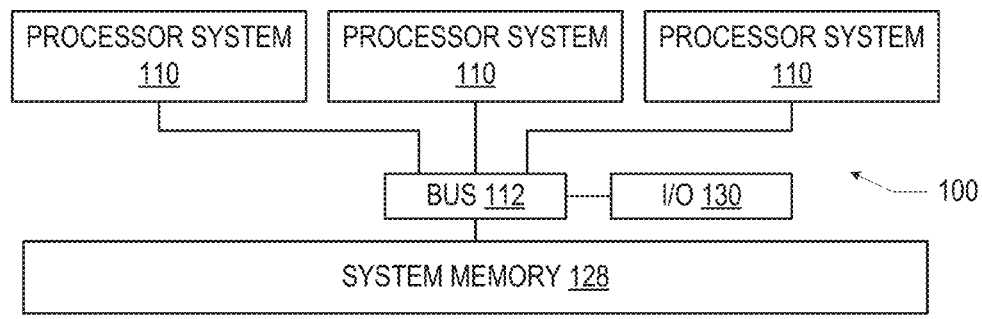
FIG. 24 is a block diagram of a multi-architecture computing system including multiple processor systems, in accordance with various embodiments.

Although FIG. 1A illustrates a multi-architecture computing system with a single processor system 110, this is simply for ease of illustration, and a multi-architecture computing system 100 may include any number of processor systems within which program control may be transferred. For example, FIG. 24 is a block diagram of a multi-architecture computing system 100 including multiple processor systems 110, in accordance with various embodiments. The processor systems 110 illustrated in FIG. 24 may have the same structure (e.g., the same numbers and ISAs of processor cores) or different structures (e.g., different numbers and ISAs of processor cores between processor systems 110). Other components included in the multi-architecture computing system 100 of FIG. 24 may include any of the components discussed above with reference to the various multi-architecture computing systems 100. Although a particular number of processor systems 110 is shown in FIG. 24, this is simply for illustration and any number of processor systems 110 may be included in a multi-architecture computing system 100.

Any of the programs or logic described herein as being stored in a memory (e.g., the system memory 128) of a multi-architecture computing system 100 may be provided to that memory in any suitable manner. In some embodiments, the memory of the multi-architecture computing system 100 may not include these programs or logic at the time that the multi-architecture computing system 100 is manufactured or shipped to a customer. For example, in some embodiments, the multi-architecture computing system 100 may be shipped with a disk, drive, or other non-transitory computer readable media on which any of the programs or logic described herein are stored; the programs or logic may be subsequently transferred from the computer readable media into the system memory 128. In another example, the multi-architecture computing system 100 may connect to a provisioning server (e.g., a remote server) and may download any of the programs or logic described herein into the system memory 128.

Figure 25:
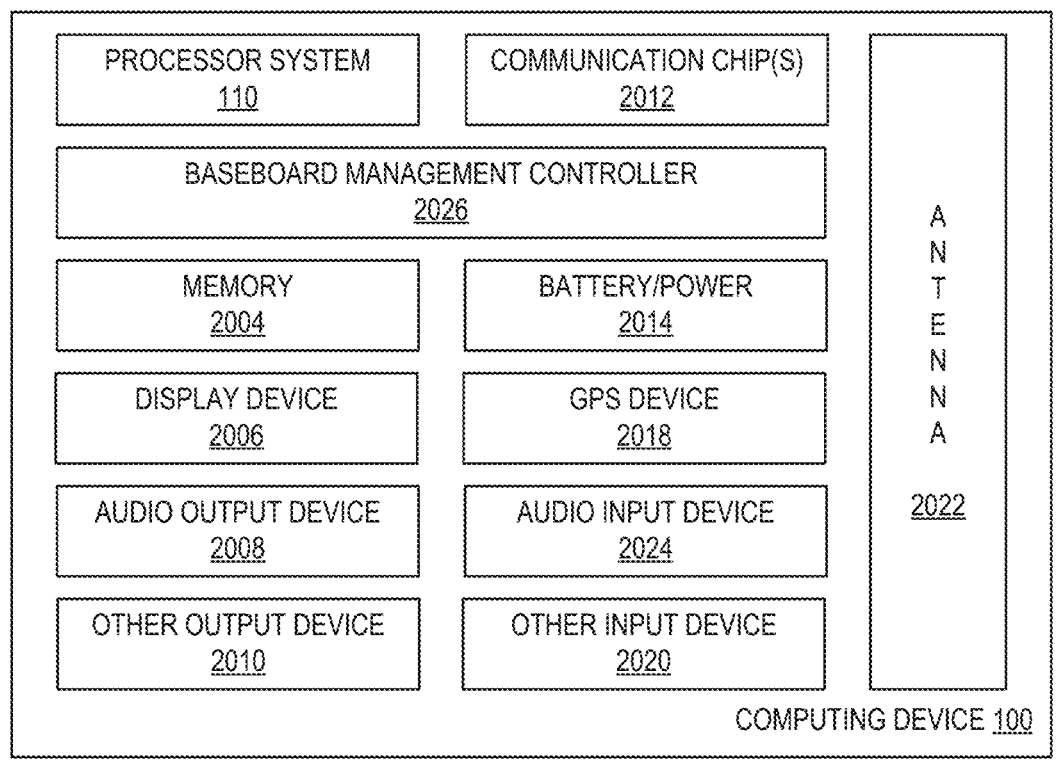
FIG. 25 is a block diagram of an example computing system, in accordance with various embodiments.

Although FIGS. 1 and 14 illustrated some particular components of multi-architecture computing systems 100, the components illustrated in FIGS. 1 and 14 are not exhaustive of all the components that may be included in a multi-architecture computing system 100. For example, FIG. 25 is a block diagram of an example computing system 100 that may serve as the multi-architecture computing system 100, in accordance with various embodiments. In some embodiments, any of the subsystems of a computing system 100 (e.g., any of the computing systems 100A or 100B), or any of the client devices 186, may take the form of the computing system of FIG. 25. A number of elements are illustrated in FIG. 25 as included in the computing system 100, but any one or more of these elements may be omitted or duplicated, as suitable for the application. A bus (not illustrated in FIG. 25) may communicatively couple the elements of the computing system 100 of FIG. 25 (e.g., the bus 112).

Additionally, in various embodiments, the computing system 100 may not include one or more of the elements illustrated in FIG. 25, but the computing system 100 may include interface circuitry for coupling to the one or more elements. For example, the computing system 100 may not include a display device 2006, but may include display device interface circuitry (e.g., a connector and driver circuitry) to which a display device 2006 may be coupled. In another set of examples, the computing system 100 may not include an audio input device 2024 or an audio output device 2008, but may include audio input or output device interface circuitry (e.g., connectors and supporting circuitry) to which an audio input device 2024 or audio output device 2008 may be coupled.

The computing system 100 may include the processor system 110. As used herein, the term "processing device" or "processor" may refer to any device or portion of a device that processes electronic data from registers and/or memory to transform that electronic data into other electronic data that may be stored in registers and/or memory. The processor system 110 may include multiple processor cores having different ISAs (as discussed above), and may include also other processors, such as one or more digital signal processors (DSPs), ASICs, CPUs, graphics processing units (GPUs), cryptoprocessors, server processors, or any other suitable processing devices. The computing system 100 may include a memory 2004, which may itself include one or more memory devices such as volatile memory (e.g., dynamic random access memory (DRAM)), non-volatile memory (e.g., read-only memory (ROM)), flash memory, solid state memory, SES, and/or a hard drive. For example, the memory 2004 may include the system memory 128.

The computing system 100 may include a baseboard management controller (BMC) 2026. The BMC 2026 is a specialized microcontroller that reads the output of sensors monitoring operational conditions of the computing system 100 (e.g., temperature, fan speeds, power consumption) and manages the interface between system-management software and platform hardware based on these readings to maintain an acceptable operating environment. Different BMCs 2026 in different computing systems 100 (e.g., in a data center 190) may communicate with each other, and remote administrators may communicate directly with the BMC 2026 to perform administrative operations. In some embodiments, the BMC 2026 may be coupled to a same circuit board (e.g., motherboard) as the processor cores 102 in the processor system 110.

In some embodiments, the computing system 100 may include a communication chip 2012 (e.g., one or more communication chips). For example, the communication chip 2012 may be configured for managing wired or wireless communications for the transfer of data to and from the computing system 100. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. The communication chip 2012 may be part of a network interface device, such as a network interface controller.

The communication chip 2012 may implement any of a number of wireless standards or protocols, including but not limited to Institute for Electrical and Electronic Engineers (IEEE) standards including WiFi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 2012 may operate in accordance with a Global System for Mobile communication (GSM), General Packet Radio Service (GPRS), Universal Mobile Telecommunications System (UMTS), High Speed Packet Access (HSPA), Evolved HSPA (E-HSPA), or LTE network. The communication chip 2012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 2012 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 2012 may operate in accordance with other wireless protocols in other embodiments. The computing system 100 may include an antenna 2022 to facilitate wireless communications and/or to receive other wireless communications (such as AM or FM radio transmissions). In some embodiments, the computing system 100 may not include an antenna, nor wireless communication capability.

In some embodiments, the communication chip 2012 may manage wired communications, such as electrical, optical, or any other suitable communication protocols (e.g., Ethernet, Infiniband, other HPC interconnects, or on-board fabrics such as QuickPath Interconnect (QPI)). The communication chip 2012 may be included in a network interface controller (NIC). As used herein, when the computing system 100 is a server, the computing system 100 may include at least the processor system 110 and a NIC. As noted above, the communication chip 2012 may include multiple communication chips. For instance, a first communication chip 2012 may be dedicated to shorter-range wireless communications such as WiFi or Bluetooth, and a second communication chip 2012 may be dedicated to longer-range wireless communications such as a global positioning system (GPS), EDGE, GPRS, CDMA, WiMAX, LTE, EV-DO, or others. In some embodiments, a first communication chip 2012 may be dedicated to wireless communications, and a second communication chip 2012 may be dedicated to wired communications.

The computing system 100 may include battery/power circuitry 2014. The battery/power circuitry 2014 may include one or more energy storage devices (e.g., batteries or capacitors) and/or circuitry for coupling elements of the computing system 100 to an energy source separate from the computing system 2000 (e.g., AC line power).

The computing system 100 may include a display device 2006 (or corresponding interface circuitry, as discussed above). The display device 2006 may include any visual indicators, such as a heads-up display, a computer monitor, a projector, a touchscreen display, a liquid crystal display (LCD), a light-emitting diode display, or a flat panel display, for example.

The computing system 100 may include an audio output device 2008 (or corresponding interface circuitry, as discussed above). The audio output device 2008 may include any device that generates an audible indicator, such as speakers, headsets, or earbuds, for example.

The computing system 100 may include an audio input device 2024 (or corresponding interface circuitry, as discussed above). The audio input device 2024 may include any device that generates a signal representative of a sound, such as microphones, microphone arrays, or digital instruments (e.g., instruments having a musical instrument digital interface (MIDI) output).

The computing system 100 may include a GPS device 2018 (or corresponding interface circuitry, as discussed above). The GPS device 2018 may be in communication with a satellite-based system and may receive a location of the computing system 100, as known in the art.

The computing system 100 may include an other output device 2010 (or corresponding interface circuitry, as discussed above). Examples of the other output device 2010 may include an audio codec, a video codec, a printer, a wired or wireless transmitter for providing information to other devices, or an additional storage device.

The computing system 100 may include an other input device 2020 (or corresponding interface circuitry, as discussed above). Examples of the other input device 2020 may include an accelerometer, a gyroscope, an image capture device, a keyboard, a cursor control device such as a mouse, a stylus, a touchpad, a bar code reader, a Quick Response (QR) code reader, any sensor, or a radio frequency identification (RFID) reader.

Any of the computing systems 100 disclosed herein may be implemented with a disaggregated architecture. For example, a computing system 100 may be implemented by different devices (e.g., different processing devices, different memory devices, and/or different network communication devices, etc.) on different racks in a datacenter, or across data centers, in communication with each other via any suitable fabric (e.g., electrical or optical buses). Although various ones of the figures may illustrate a computing system 100 as a monolithic device, this is simply for ease of illustration, and a computing system 100 may be disaggregated in any suitable manner. In some embodiments, different ones of the processor cores 102 in a computing system 100 may be in different racks in a datacenter, or in different datacenters (and execution of a program may be transferred between these different processor cores 102, as described herein). In some embodiments, the system memory 128 of a computing system 100 may be provided by multiple memory devices in different racks in a data center and/or in different datacenters.

The following paragraphs provide examples of various embodiments disclosed herein.

Example 1 is a computing system, including: a processor system including at least one first processor core having a first instruction set architecture (ISA); a memory device coupled to the processor system, wherein the memory device has stored thereon a first binary representation of a program for the first ISA; and control logic to suspend execution of the program by the at least one first processor core and cause at least one second processor core to resume execution of the program, wherein the at least one second processor core has a second ISA different from the first ISA;

wherein the program is to generate data having an in-memory representation compatible with both the first ISA and the second ISA.

Example 2 may include the subject matter of Example 1, and may further include the second processor core.

Example 3 may include the subject matter of any of Examples 1-2, and may further specify that cause the at least one second processor core to resume execution of the program includes provide the data to the at least one second processor core.

Example 4 may include the subject matter of Example 3, and may further specify that execution of the program by the at least one second processor core includes reading the data.

Example 5 may include the subject matter of any of Examples 1-4, and may further specify that the at least one second processor core is coupled to a memory including a second binary representation of the program for the second ISA.

Example 6 may include the subject matter of any of Examples 1-5, and may further specify that the one of the first ISA and the second ISA is a reduced instruction set computing (RISC) architecture, and an other of the first ISA and the second ISA is a complex instruction set computing (CISC) architecture.

Example 7 may include the subject matter of any of Examples 1-6, and may further specify that the control logic is included in an operating system, and the operating system is to control operation of the at least one first processor core.

Example 8 may include the subject matter of any of Examples 1-7, and may further specify that the computing system is included in a mobile computing device.

Example 9 may include the subject matter of any of Examples 1-8, and may further specify that the computing system is in a first housing, and the second processor core is in a second housing different from the first housing.

Example 10 may include the subject matter of Example 9, and may further specify that the second housing is a housing of a docking station.

Example 11 may include the subject matter of any of Examples 1-10, and may further specify that the second processor core is part of a datacenter.

Example 12 may include the subject matter of Example 11, and may further specify that the first processor core is included in a set-top box.

Example 13 may include the subject matter of any of Examples 1-12, and may further specify that the computing system does not include any processor cores having an ISA different from the first ISA.

Example 14 may include the subject matter of any of Examples 1-7, and may further specify that the computing system is a docking station.

Example 15 may include the subject matter of any of Examples 1-7, and may further specify that the computing system is a server system.

Example 16 may include the subject matter of any of Examples 1-7, and may further specify that the second processor core is included in a mobile computing device.

Example 17 may include the subject matter of any of Examples 1-7, and may further specify that the second processor core is included in a set-top box.

Example 18 is a computing system, including: a processor system including at least one first processor core having a first instruction set architecture (ISA); a memory device coupled to the processor system, wherein the memory device has stored thereon a first binary representation of a program for the first ISA; and control logic to resume execution of the program by the at least one first processor core in response to an instruction from a server system, wherein the server system includes at least one second processor core that previously executed the program, and wherein the at least one second processor core has a second ISA different from the first ISA; wherein the program is to generate data having an in-memory representation compatible with both the first ISA and the second ISA, and wherein the server system is to provide the instruction in response to a determination that a communication link between the server system and the computing system meets one or more impending loss criteria.

Example 19 may include the subject matter of Example 18, and may further specify that the determination that the communication link meets one or more impending loss criteria includes a determination that a remaining charge of a power source of the computing system is below a threshold.

Example 20 may include the subject matter of any of Examples 18-19, and may further specify that the determination that the communication link meets one or more impending loss criteria includes a determination that the computing system is in proximity to a geofence boundary.

Example 21 may include the subject matter of any of Examples 18-20, and may further specify that the determination that the communication link meets one or more impending loss criteria includes a determination that the computing system is about to enter an offline mode.

Example 22 may include the subject matter of any of Examples 18-21, and may further specify that the determination that the communication link meets one or more impending loss criteria includes a determination that the computing system will be physically disconnected from a docking station or cable.

Example 23 may include the subject matter of any of Examples 18-22, and may further specify that the computing system is included in a mobile computing device.

Example 24 may include the subject matter of any of Examples 18-23, and may further specify that the computing system does not include any processor cores having an ISA different from the first ISA.

Example 25 may include the subject matter of any of Examples 18-24, and may further include the at least one second processor core.

Example 26 may include the subject matter of any of Examples 18-25, and may further specify that the at least one second processor core is coupled to a memory including a second binary representation of the program for the second ISA.

Example 27 may include the subject matter of any of Examples 18-26, and may further specify that the first ISA is a reduced instruction set computing (RISC) architecture, and the second ISA is a complex instruction set computing (CISC) architecture.

Example 28 may include the subject matter of any of Examples 18-27, and may further specify that the control logic is included in an operating system, and the operating system is to control operation of the at least one first processor core.

Example 29 may include the subject matter of any of Examples 18-28, and may further specify that a processor core of the at least one first processor core has lower power consumption than a processor core of the second processor core.

Example 30 may include the subject matter of any of Examples 18-29, and may further specify that the first ISA has a first set of operation codes, the second ISA has a second set of operation codes, the first set is not a proper subset of the second set, and the second set is not a proper subset of the first set.

Example 31 is a first computing system, including: a processor system including at least one first processor core having a first instruction set architecture (ISA); a memory device coupled to the processor system, wherein the memory device has stored thereon a first binary representation of a program for the first ISA; and control logic to stop execution of the program by the at least one first processor core and instruct at a second computing system to resume execution of the program with at least one second processor core of the second computing system, wherein the at least one second processor core has a second ISA different from the first ISA; wherein the program is to generate data having an in-memory representation compatible with both the first ISA and the second ISA.

Example 32 may include the subject matter of Example 31, and may further specify that the first computing system is a server system.

Example 33 may include the subject matter of any of Examples 31, and may further specify that the second computing system is a personal computing device.

Example 34 may include the subject matter of Example 33, and may further specify that the personal computing device is a mobile computing device.

Example 35 may include the subject matter of any of Examples 31-34, and may further specify that the first computing system is to provide the instruction in response to a determination that a communication link between the first computing system and the second computing system meets one or more impending loss criteria.

Example 36 may include the subject matter of Example 35, and may further specify that the determination that the communication link meets one or more impending loss criteria includes a determination that a remaining charge of a power source of the second computing system is below a threshold.

Example 37 may include the subject matter of any of Examples 35-36, and may further specify that the determination that the communication link meets one or more impending loss criteria includes a determination that the second computing system is in proximity to a geofence boundary.

Example 38 may include the subject matter of any of Examples 35-37, and may further specify that the determination that the communication link meets one or more impending loss criteria includes a determination that the second computing system is about to enter an offline mode.

Example 39 may include the subject matter of any of Examples 35-38, and may further specify that the determination that the communication link meets one or more impending loss criteria includes a determination that the second computing system will be physically disconnected from a docking station or cable.

Example 40 may include the subject matter of any of Examples 31-39, and may further specify that the second computing system does not include any processor cores having an ISA different from the second ISA.

Example 41 may include the subject matter of any of Examples 31-40, and may further specify that the at least one second processor core is coupled to a memory including a second binary representation of the program for the second ISA.

Example 42 may include the subject matter of any of Examples 31-41, and may further specify that the first ISA is a complex instruction set computing (CISC) architecture, and the second ISA is a reduced instruction set computing (RISC) architecture.

Example 43 may include the subject matter of any of Examples 31-42, and may further specify that a processor core of the at least one first processor core has higher power consumption than a processor core of the second processor core.

Example 44 may include the subject matter of any of Examples 31-43, and may further include a baseboard management controller (BMC) coupled to the first processor core and the memory device.

Example 45 may include the subject matter of any of Examples 31-44, and may further include a network interface to communicate with the second computing system via a computing network.

Example 46 may include the subject matter of any of Examples 31-45, and may further specify that the program includes a virtual machine (VM), a container, or an application.

Example 47 is a method of operating a first computing system, including: executing a program by at least one first processor core of the first computing system, wherein the at least one first processor core has a first instruction set architecture (ISA); suspending execution of the program by the at least one first processor core; and causing at least one second processor core of a second computing system to resume execution of the program, wherein the at least one second processor core has a second ISA different from the first ISA, and wherein the program is to generate data having an in-memory representation compatible with both the first ISA and the second ISA.

Example 48 may include the subject matter of Example 47, and may further specify that the first computing system is included in a mobile computing device.

Example 49 may include the subject matter of Example 47, and may further specify that the second computing system is included in a datacenter.

Example 50 may include the subject matter of Example 47, and may further specify that the first computing system is included in a set-top box.

Example 51 may include the subject matter of any of Examples 47-50, and may further specify that the first computing system does not include any processor cores having an ISA different from the first ISA.

Example 52 may include the subject matter of any of Examples 47-51, and may further specify that the first ISA is a reduced instruction set computing (RISC) architecture, and the second ISA is a complex instruction set computing (CISC) architecture.

Example 53 may include the subject matter of any of Examples 47-51, and may further specify that the first computing system is included in a docking station.

Example 54 may include the subject matter of any of Examples 47-51, and may further specify that the first computing system is a server system.

Example 55 may include the subject matter of any of Examples 47-51, and may further specify that the second computing system is included in a mobile computing device.

Example 56 may include the subject matter of any of Examples 47-51, and may further specify that the second computing system is included in a set-top box.

Example 57 is a method of operating a computing system, including: receive an instruction from a server system to resume execution of a program by at least one first processor core, wherein the at least one first processor core has a first instruction set architecture (ISA), the server system includes at least one second processor core that previously executed the program, the at least one second processor core has a second ISA different from the first ISA, and the program is to generate data having an in-memory representation compatible with both the first ISA and the second ISA; and in response to the instruction, resuming execution of the program by the at least one first processor core.

Example 58 may include the subject matter of Example 57, and may further specify that the server system is to provide the instruction in response to a determination that a communication link between the server system and the computing system meets one or more impending loss criteria.

Example 59 may include the subject matter of Example 58, and may further specify that the determination that the communication link meets one or more impending loss criteria includes a determination that a remaining charge of a power source of the computing system is below a threshold.

Example 60 may include the subject matter of any of Examples 58-59, and may further specify that the determination that the communication link meets one or more impending loss criteria includes a determination that the computing system is in proximity to a geofence boundary.

Example 61 may include the subject matter of any of Examples 58-60, and may further specify that the determination that the communication link meets one or more impending loss criteria includes a determination that the computing system is about to enter an offline mode.

Example 62 may include the subject matter of any of Examples 58-61, and may further specify that the determination that the communication link meets one or more impending loss criteria includes a determination that the computing system will be physically disconnected from a docking station or cable.

Example 63 may include the subject matter of any of Examples 57-62, and may further specify that the computing system is included in a mobile computing device.

Example 64 may include the subject matter of any of Examples 57-63, and may further specify that the computing system does not include any processor cores having an ISA different from the first ISA.

Example 65 may include the subject matter of any of Examples 57-64, and may further specify that the first ISA is a reduced instruction set computing (RISC) architecture, and the second ISA is a complex instruction set computing (CISC) architecture.

Example 66 may include the subject matter of any of Examples 57-65, and may further specify that a processor core of the at least one first processor core has lower power consumption than a processor core of the second processor core.

Example 67 may include the subject matter of any of Examples 57-66, and may further specify that the first ISA has a first set of operation codes, the second ISA has a second set of operation codes, the first set is not a proper subset of the second set, and the second set is not a proper subset of the first set.

Example 68 is a method of operating a first computing system, including: executing a program with at least one first processor core, wherein the at least one first processor core has a first instruction set architecture (ISA); suspending execution of the program with the at least one first processor core; and providing an instruction to a second computing system to resume execution of the program by at least one second processor core of the second computing system, wherein the at least one second processor core has a second ISA different from the first ISA, and execution of the program generates data having an in-memory representation compatible with both the first ISA and the second ISA.

Example 69 may include the subject matter of Example 68, and may further specify that the first computing system is a server system.

Example 70 may include the subject matter of any of Examples 68-69, and may further specify that the second computing system is a personal computing device.

Example 71 may include the subject matter of Example 70, and may further specify that the personal computing device is a mobile computing device.

Example 72 may include the subject matter of any of Examples 68-71, and may further include, before providing the instruction to the second computing system, determining that a communication link between the first computing system and the second computing system meets one or more impending loss criteria; wherein the instruction is provided to the second computing system in response to the determination.

Example 73 may include the subject matter of Example 72, and may further specify that determining that the communication link meets one or more impending loss criteria includes determining that a remaining charge of a power source of the second computing system is below a threshold.

Example 74 may include the subject matter of any of Examples 72-73, and may further specify that determining that the communication link meets one or more impending loss criteria includes determining that the second computing system is in proximity to a geofence boundary.

Example 75 may include the subject matter of any of Examples 72-74, and may further specify that determining that the communication link meets one or more impending loss criteria includes determining that the second computing system is about to enter an offline mode.

Example 76 may include the subject matter of any of Examples 72-75, and may further specify that determining that the communication link meets one or more impending loss criteria includes determining that the second computing system will be physically disconnected from a docking station or cable.

Example 77 may include the subject matter of any of Examples 68-76 wherein the second computing system does not include any processor cores having an ISA different from the second ISA.

Example 78 may include the subject matter of any of Examples 68-77, and may further specify that the first ISA is a complex instruction set computing (CISC) architecture, and the second ISA is a reduced instruction set computing (RISC) architecture.

Example 79 may include the subject matter of any of Examples 68-78, and may further specify that a processor core of the at least one first processor core has higher power consumption than a processor core of the second processor core.

Example 80 may include the subject matter of any of Examples 68-77, and may further specify that the first computing system and the second computing system communicate via a computing network.

Example 81 may include the subject matter of any of Examples 68-78, and may further specify that the program includes a virtual machine (VM), a container, or an application.

Example 82 is one or more computer readable media having instructions thereon that, in response to execution by one or more processing devices of a computing system, cause the computing system to perform the method of any of Examples 47-81.

Example 83 is a computing system including means for performing the method of any of Examples 47-81.

The invention claimed is:

1. A computing system, comprising:
a processor system including at least one first processor core having a first instruction set architecture (ISA);
a memory device coupled to the processor system, wherein the memory device has stored thereon a first binary representation of a program for the first ISA; and
control logic to suspend execution of the program by the at least one first processor core and cause at least one second processor core to resume execution of the program, wherein the at least one second processor core has a second ISA different from the first ISA;
wherein the program is to generate data having an in-memory representation compatible with both the first ISA and the second ISA.

2. The computing system of claim 1, wherein cause the at least one second processor core to resume execution of the program includes provide the data to the at least one second processor core.

3. The computing system of claim 2, wherein execution of the program by the at least one second processor core includes reading the data.

4. The computing system of claim 1, wherein the at least one second processor core is coupled to a memory including a second binary representation of the program for the second ISA.

5. The computing system of claim 1, wherein the one of the first ISA and the second ISA is a reduced instruction set computing (RISC) architecture, and an other of the first ISA and the second ISA is a complex instruction set computing (CISC) architecture.

6. The computing system of claim 1, wherein the computing system is included in a mobile computing device.

7. The computing system of claim 1, wherein the computing system is in a first housing, and the second processor core is in a second housing different from the first housing.

8. The computing system of claim 7, wherein the second housing is a housing of a docking station.

9. The computing system of claim 1, wherein the second processor core is part of a datacenter.

10. The computing system of claim 9, wherein the first processor core is included in a set-top box.

11. The computing system of claim 1, wherein the computing system does not include any processor cores having an ISA different from the first ISA.

12. The computing system of claim 1, wherein the computing system is a server system.

13. A computing system, comprising:
a processor system including at least one first processor core having a first instruction set architecture (ISA);
a memory device coupled to the processor system, wherein the memory device has stored thereon a first binary representation of a program for the first ISA; and
control logic to resume execution of the program by the at least one first processor core in response to an instruction from a server system, wherein the server system includes at least one second processor core that previously executed the program, and wherein the at least one second processor core has a second ISA different from the first ISA;
wherein the program is to generate data having an in-memory representation compatible with both the first ISA and the second ISA, and wherein the server system is to provide the instruction in response to a determination that a communication link between the server system and the computing system meets one or more impending loss criteria.

14. The computing system of claim 13, wherein the determination that the communication link meets one or more impending loss criteria includes a determination that a remaining charge of a power source of the computing system is below a threshold.

15. The computing system of claim 13, wherein the determination that the communication link meets one or more impending loss criteria includes a determination that the computing system is in proximity to a geofence boundary.

16. The computing system of claim 13, wherein the determination that the communication link meets one or more impending loss criteria includes a determination that the computing system is about to enter an offline mode.

17. The computing system of claim 13, wherein the determination that the communication link meets one or more impending loss criteria includes a determination that the computing system will be physically disconnected from a docking station or cable.

18. A first computing system, comprising:
a processor system including at least one first processor core having a first instruction set architecture (ISA);
a memory device coupled to the processor system, wherein the memory device has stored thereon a first binary representation of a program for the first ISA; and
control logic to stop execution of the program by the at least one first processor core and instruct a second computing system to resume execution of the program with at least one second processor core of the second computing system, wherein the at least one second processor core has a second ISA different from the first ISA;
wherein the program is to generate data having an in-memory representation compatible with both the first ISA and the second ISA.

19. The first computing system of claim 18, wherein the first computing system is a server system.

20. The first computing system of claim 18, wherein the second computing system is a personal computing device.

21. The first computing system of claim 20, wherein the personal computing device is a mobile computing device.

22. The first computing system of claim 18, wherein a processor core of the at least one first processor core has higher power consumption than a processor core of the second processor core.

23. The first computing system of claim 18, further comprising:
a baseboard management controller (BMC) coupled to the first processor core and the memory device.

24. The first computing system of claim 18, further comprising:
a network interface to communicate with the second computing system via a computing network.

25. The first computing system of claim 18, wherein the program includes a virtual machine (VM), a container, or an application.

* * * * *